US008160403B2

United States Patent
Hatayama et al.

(10) Patent No.: US 8,160,403 B2
(45) Date of Patent: Apr. 17, 2012

(54) IMAGE TRANSMITTING APPARATUS AND IMAGE TRANSMITTING PROGRAM

(75) Inventors: Hideo Hatayama, Kyoto (JP); Masamichi Sakaino, Kyoto (JP); Masaru Nishita, Kyoto (JP); Takeshi Shimada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 930 days.

(21) Appl. No.: 12/219,931

(22) Filed: Jul. 30, 2008

(65) Prior Publication Data

US 2009/0297066 A1 Dec. 3, 2009

(30) Foreign Application Priority Data

May 30, 2008 (JP) .................................. 2008-141908

(51) Int. Cl.
*G06K 9/03* (2006.01)
*H04N 1/387* (2006.01)
*G06F 17/00* (2006.01)

(52) U.S. Cl. ...................... 382/311; 358/452; 715/243

(58) Field of Classification Search .................. 382/276, 382/305, 309, 311, 312; 358/452, 453, 508; 463/1, 25, 29; 345/645; 715/204, 243; 434/247
See application file for complete search history.

(56) References Cited

U.S. PATENT DOCUMENTS

| 5,459,827 | A | * | 10/1995 | Allouche et al. ............... 715/204 |
| 5,757,379 | A | * | 5/1998 | Saito .............................. 345/645 |
| 6,164,973 | A | * | 12/2000 | Macri et al. .................... 434/247 |
| 6,665,841 | B1 | * | 12/2003 | Mahoney et al. ............. 715/204 |
| 7,190,481 | B2 | * | 3/2007 | Hirabayashi ................. 358/1.18 |
| 7,401,289 | B2 | * | 7/2008 | Lachhwani et al. .......... 715/243 |
| 7,454,698 | B2 | * | 11/2008 | Kohda et al. .................. 715/254 |
| 7,530,895 | B2 | * | 5/2009 | Kigoshi .......................... 463/23 |
| 7,930,632 | B2 | * | 4/2011 | Takashima et al. ........... 715/243 |

FOREIGN PATENT DOCUMENTS

JP 2004-303054 10/2004

* cited by examiner

*Primary Examiner* — Kanjibhai Patel
(74) *Attorney, Agent, or Firm* — Nixon & Vanderhye P.C.

(57) ABSTRACT

A game apparatus functioning as an image transmitting apparatus includes a CPU. The CPU performs an edit of at least one image with a controller according to an instruction by a user, transmits image data of the image through a wireless communication module to a network during execution of the edit, and further transmits layout information indicating a layout of the image after completion of the edit.

22 Claims, 16 Drawing Sheets

FIG. 3
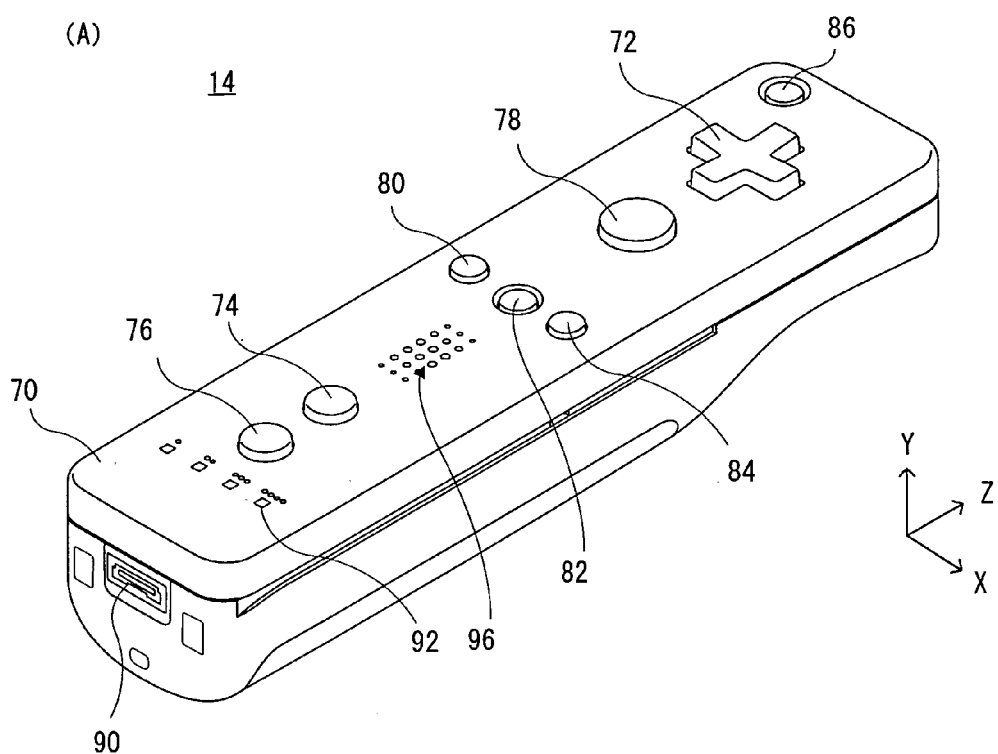
(A)
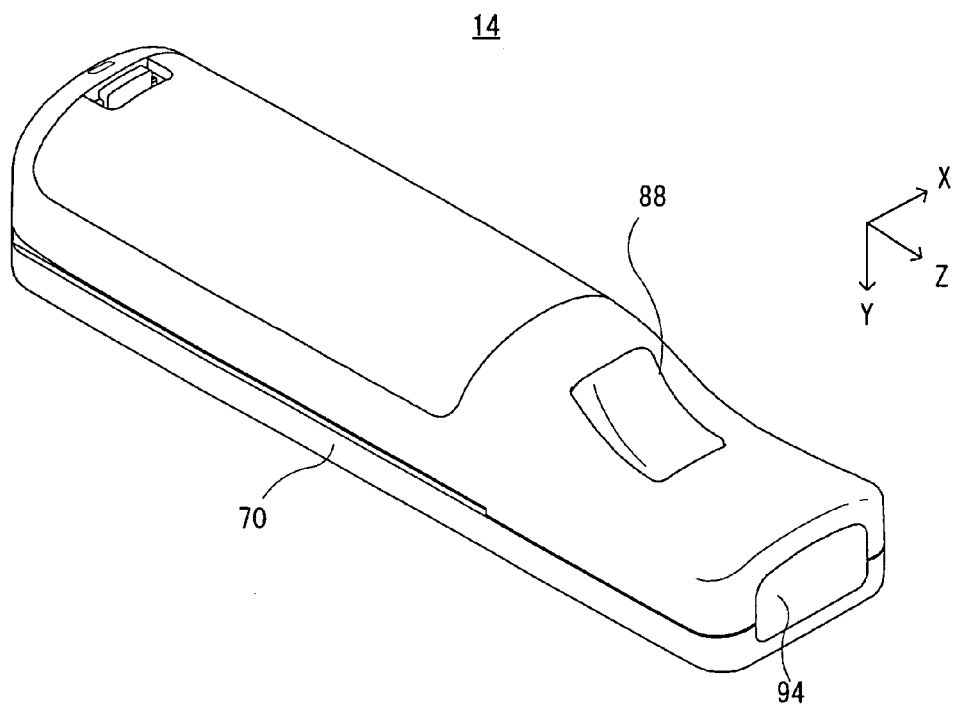
(B)

FIG. 5
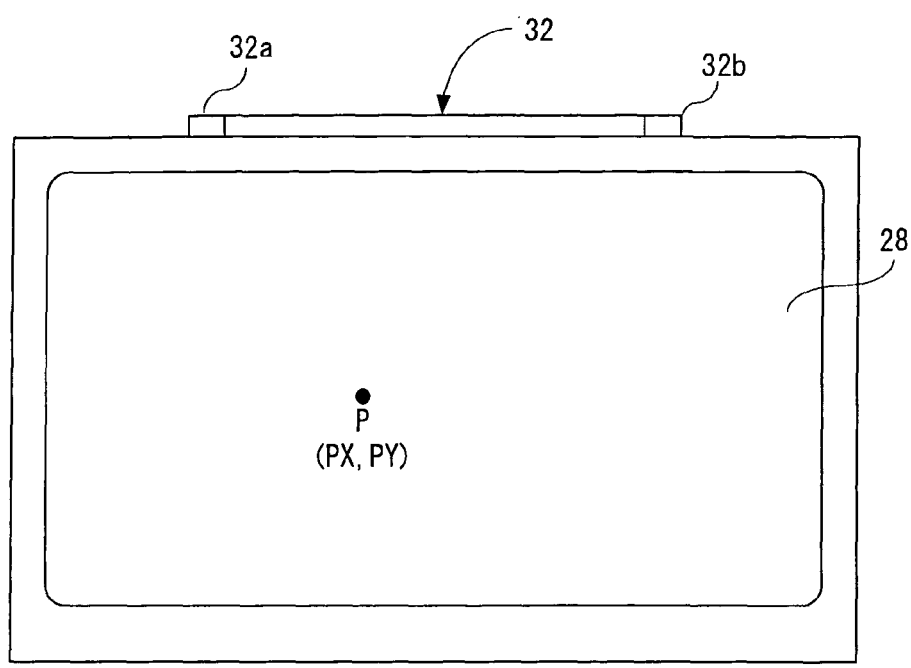
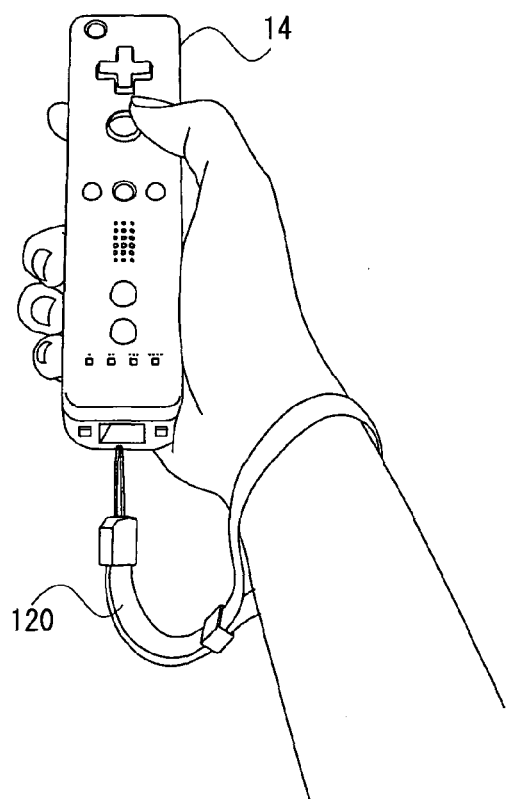

FIG. 11

(A) (IMAGE FILE)

| IMAGE ID | FILE INFORMATION: FILE NAME, CREATION DATE, etc. | IMAGE DATA |
|---|---|---|

(B) (LAYOUT INFORMATION)

| IMAGE ID | POSITIONAL DATA | SIZE DATA | ... |
|---|---|---|---|

(C) (SAVE DATA)

| FILE INFORMATION | LAYOUT INFORMATION | TRANSMISSION LIST |
|---|---|---|

FIG. 12

(TRANSMISSION LIST)

| IMAGE ID | 0 | 1 | 2 | 3 | 4 | ... | 999 |
|---|---|---|---|---|---|---|---|
| TRANSMISSION OBJECT FLAG: 0=NOT AN OBJECT TO BE TRANSMITTED 1=AN OBJECT TO BE TRANSMITTED | 1 | 1 | 0 | 1 | 0 | ... | 0 |
| TRANSMISSION TERMINATION FLAG: 0=EACH IMAGE HAS NOT YET BEEN TRANSMITTED 1=EACH IMAGE HAS ALREADY BEEN TRANSMITTED | 1 | 1 | 0 | 0 | 0 | ... | 0 |

IMAGE TRANSMITTING APPARATUS AND IMAGE TRANSMITTING PROGRAM

CROSS REFERENCE OF RELATED APPLICATION

The disclosure of Japanese Patent Application No. 2008-141908 is incorporated herein by reference.

BACKGROUND OF THE INVENTION

1. Field of the Invention

The present invention relates to an image transmitting apparatus and an image transmitting program. More specifically, the present invention relates to an image transmitting apparatus and an image transmitting program which transmit image data and control information for executing a print processing based on the image data according to an operation by a user.

2. Description of the Related Art

One example of such a kind of a mobile information terminal is disclosed in a Japanese Patent Application Laid-Open No. 2004-303054. In the related art, a mobile information terminal produces order information to print image data according to an input by a user, adds the order information to a tag of the image data, then transmits the tagged imaged data to a printer equipped shop.

However, in the related art, the image data is transmitted together with the order information, that is, the image data is transmitted after completion of the user input for order, resulting in a long standby time for the user until completion of the transmission.

SUMMARY OF THE INVENTION

Therefore, it is a primary object of the present invention to provide a novel image transmitting apparatus and image transmitting program.

Another object of the present invention is to provide an image transmitting apparatus and an image transmitting program which can cut, when image data and control information for executing print processing based on the image data according to an operation by a user (layout information, order information, etc.) is transmitted, a standby time until completion of the transmission.

The present invention employs following features in order to solve the above-described problems. It should be noted that reference numerals inside the parentheses and supplemental remarks show one example of a corresponding relationship with the embodiments described later for easy understanding of the present invention, and do not limit the present invention.

A first invention is an image transmitting apparatus to transmit image data and a layout of an image to a network on the basis of an edit of the image by a user, comprises: an editing means for performing an edit of at least one image on the basis of an instruction by the user; an image data transmitting means for transmitting image data of the image as the object to be edited during execution of the edit; and a layout information transmitting means for transmitting layout information indicating a layout of the image after completion of the edit.

In the first invention, an image transmitting apparatus (12) transmits image data and a layout of an image to a network (124) on the basis of an edit of the image by a user. In the image transmitting apparatus, an editing means (S21) performs an edit of at least one image on the basis of an instruction by the user. For example, a position and a size of each image is changed, a foreground and a background are added to each image or changed, and forth. During execution of the edit by the user, an image data transmitting means (S61-S71) transmits image data of the image as the object to be edited during execution of the edit. After completion of the edit, the result of the edit, that is, layout information indicating a layout of the image is transmitted by a transmitting means (S53).

According to the first invention, during execution of the edit by the user, the transmission of the image data proceeds in the background, so that it is possible to cut a time required until the transmission is completed.

A second invention is an image transmitting apparatus according to the first invention, and further comprises: an image data storing means for storing image data; and a selecting means for causing a user to select an image as the object to be edited, wherein the image data transmitting means transmits image data of the image selected by the selecting means out of the image data stored in the image data storing means.

In the second invention, an image data storing means (142) stores image data, and a selecting means (S23) causes a user to select an image as the object to be edited. The image data transmitting means transmits image data of the image selected by the selecting means out of the image data stored in the image data storing means.

According to the second invention, it is possible for the user to transmit the image data of the desired image.

A third invention is an image transmitting apparatus according to the second invention, further comprises: a transmission list storing means for storing a list of images to be transmitted with respect to the image data stored in the image data storing means; and a transmission image adding means for adding, every time that an image is selected by the selecting means, the selected image to the list, wherein the image data transmitting means transmits the image data of the images included in the list during execution of the edit.

In the third invention, the list (FIG. 12) of images to be transmitted with respect to the image data stored in the image data storing means is stored in the transmission list storing means (144). A transmission image adding means (S25) adds, every time that an image is selected by the selecting means, the selected image to the list. The image data transmitting means transmits the image data of the images included in the list during execution of the edit.

According to the third invention, it is possible to start the edit after selecting each image, or add an image during execution of the edit.

A fourth invention is an image transmitting apparatus according to the first or the second invention, and the layout information transmitting means transmits the layout information after completion of the edit, and after completion of transmitting the image data.

A fifth invention is an image transmitting apparatus according to the third invention, and further comprising: a suspended information storing means for storing a layout which is being edited and the list of the image to be transmitted with respect to the image data stored in the image data storing means in a case that the edit is suspended; and an edit restarting means for restarting the edit on the basis of the layout stored in the suspended information storing means, wherein the image data transmitting means transmits the image data which has not yet been transmitted out of the image to be transmitted on the basis of the list stored in the suspended information storing means after restarting the edit.

In the fifth invention, if the edit is suspended due to a suspend operation by the user and a change in a communicated state with a network, a suspended information storing means (148, S33) stores a layout which is being edited and the list of the image to be transmitted. The suspended edit is restarted on the basis of the layout stored in the suspended information storing means by the edit restarting means (S7, S9). The image data transmitting means transmits the image data which has not yet been transmitted out of the image to be transmitted on the basis of the list stored in the suspended information storing means after restarting the edit.

According to the fifth invention, it is possible to avoid waste of restarting the edit and the transmission of the image data from the top every time that the edit is suspended.

A sixth invention is an image transmitting apparatus according to the second invention, further comprises an interface displaying means for displaying an edit area to allow the user to perform an edit and a selection area where images are arranged so as to be selectable as the object to be edited, wherein the selecting means makes a selection by causing the user to arrange an image within the selection area to the edit area.

In the sixth invention, an interface displaying means (42*b*) displays on a display (28) an edit area (E2) to allow the user to perform an edit and a selection area (E1) where images are arranged so as to be selectable as the object to be edited (FIG. 13). When the user arranges (moves) an image within the selection area to the edit area, the image is selected by the selecting means so as to be an object to be edited and transmitted.

According to the sixth invention, the user can easily select the object image by arranging an image within the selection area to the edit area.

A seventh invention is an image transmitting apparatus according to the sixth invention, wherein the layout information includes at least identification information for identifying image data, a position of an image and a size of an image, and the editing means performs an edit of the layout by causing the user to arrange the image within the edit area.

In the seventh invention, the layout information includes at least identification information for identifying image data, a position of an image and a size of an image. When the user arranges an image within the edit area, such layout information is edited by the editing means.

According to the seventh invention, the user can easily edit the layout information by arrange the image within the edit area.

An eighth invention is an image transmitting apparatus according to the fifth invention, the suspended information storing means further stores identification information for identifying the images stored in the image data storing means at a time of suspending the edit, further comprises a determining means for, by comparing the identification information of the image stored in the image data storing means and the identification information stored in the suspended information storing means at a time of restarting the edit, determining at a time of restarting the edit whether or not the image data stored in the image data storing means is identical with the image at a time of suspending the edit, wherein the image data transmitting means transmits the image data of the image which has not yet been transmitted out of the images to be transmitted on the basis of the list stored in the suspended information storing means after restarting the edit in a case that the determining means determines that the image data is identical with the image data at a time of suspending the edit.

In the eighth invention, identification information for identifying the images stored in the image data storing means is further stored in the suspended information storing means. The identification information stored in the suspended information storing means is compared with the identification information of the image stored in the image data storing means at a restarting the edit, and a determining means (S5) determines whether or not the image data stored in the image data storing means is identical with the image at a time of suspending the edit on the basis of the comparison result. In a case that the determining means determines that the image data is identical with the image data at a time of suspending the edit, the image data transmitting means transmits the image data which has not yet been transmitted out of the images to be transmitted on the basis of the list stored in the suspended information storing means after restarting the edit.

Here, in a case that the determining means determines that the image data which is identical with the image data at a time of suspending the edit is not stored, the image data transmitting means transmits image data of each image to be transmitted on the basis of the list stored in the transmission list storing means. That is, the images stored in the image data storing means are regarded as not having been transmitted yet and all becomes object to be transmitted.

According to the eighth invention, it is possible to avoid waste of transmitting the image data which has already been transmitted again.

A ninth invention is an image transmitting apparatus according to the third invention, and the list registers identification information for identifying each image, the image data transmitting means transmits identification information of the image in addition to the image data of each image, the network has a server for receiving the image data from the image data transmitting means and returning the identification information in addition to the image data, further comprises a determining means for determining whether or not the server receives each image by checking the identification information returned from the server with the identification information registered in the list, wherein the image data transmitting means resends the image which the determining means determines that the server does not receive.

In the ninth invention, the list registers identification information for identifying each image, and the image data transmitting means transmits identification information of the image in addition to the image data of each image. The network has a server (122) for receiving the image data from the image data transmitting means and returning the identification information in addition to the image data, and a determining means (S45) for determining whether or not the server receives each image by checking the identification information returned from the server with the identification information registered in the list. The image data transmitting means resends the image which the determining means determines that the server does not receive (S49).

According to the ninth invention, whether or not the image data of each transmitted image is received by the server is determined on the basis of the presence or absence of the return of the identification information, and the image data of the image which is determined to be not received is resent, allowing for sure reception of the image data.

Each of tenth-eighteenth inventions is an image transmitting program causing a computer (40) of an image transmitting apparatus (12) to transmit image data and a layout of the image to a network (124) on the basis of the edit of the image by the user to function as each means described in the invention of claims 1-9.

A nineteenth invention is an image transmitting method of an image transmitting apparatus to transmit image data and a layout of an image to a network on the basis of an edit of the image by a user, comprises: an editing step for performing an edit of at least one image on the basis of an instruction by the user; an image data transmitting step for transmitting image data of the image as the object to be edited during execution of the edit; and a layout information transmitting step for transmitting layout information indicating a layout of the image after completion of the edit.

A twentieth invention is an image transmitting apparatus for transmitting image data corresponding to a desired image and control information according to an operation by a user to execute print processing based on the image data, comprises: a first updating means for repetitively executing update processing to update the control information in response to an updating operation; a first transmitting means for executing transmission processing to transmit the image data in parallel with the update processing by the first updating means; and a second transmitting means for executing transmission processing of the control information after end of executing the update processing by the first updating means.

In the twentieth invention, an image transmitting apparatus (12) transmits image data and control information in order to prompt the print server (122) to perform print processing. The control information is respectively updated every updating operation by a first updating means (S21, S31). For example, when the user performs a layout edit operation, a print size/sheet count designating operation, etc., layout information, print size/sheet count information included in the control information, etc. are updated every operation. The transmission processing for transmitting the image data is performed by a first transmitting means (S65, S67) in parallel with the update processing by the first updating means. The transmission processing for transmitting the control information is executed by a second transmitting means (S29, S53) after end of executing the update processing by the first updating means, that is, after the control information is decided.

According to the twentieth invention, while the user performs the updating operation of the control information, the transmission of the image progresses in the background, so that it is possible to cut a standby time until completion of the transmission.

The twenty-first invention is an image transmitting apparatus according to the twentieth invention, wherein the first transmitting means starts the transmission processing in response to a specifying operation for specifying at least a part of the desired image.

In the twenty-first invention, it is possible to start the transmission processing of the image data at a time when the desired image is specified.

According to the twenty-first invention, it is possible to more cut the standby time.

A twenty-second invention is an image transmitting apparatus according to the twentieth or the twenty-first invention, and further comprises: a second updating means for updating a list on which identifiers of the images which has not been transmitted yet out of the desired images are registered in correspondence with progress of the transmission processing by the first transmitting means; and a saving means for saving the control information and the list in response to a suspend operation, wherein the first updating means and the first transmitting means restart the update processing and the transmission processing, respectively after updating the control information and the list with the control information and the list saved by the saving means in response to the restart operation.

In the twenty-second invention, a second updating means (S71) updates a list on which identifiers of the images which has not been transmitted yet out of the desired images are registered in correspondence with progress of the transmission processing by the first transmitting means. A saving means (S33) saves the control information and the list in response to a suspend operation, and the first updating means and the first transmitting means restart the update processing and the transmission processing, respectively after updating the control information and the list with the control information and the list saved by the saving means in response to the restart operation.

According to the twenty-second invention, it is possible to avoid waste of trying again from the beginning every time that an updating operation of the control information and transmission processing of image data are suspended.

According to the present invention, when the image data and the control information for executing print processing based on the image data according to an operation by a user are transmitted, it is possible to cut a standby time until completion of the transmission.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 (A) is a perspective view of a controller used in the game system as seeing it from above rear;

FIG. 3 (B) is a perspective view of the controller used in the game system as seeing it from below front;

FIG. 5 is an illustrative view showing a state in which a game is played by means of the controller;

FIG. 11(A) is an illustrative view showing a configuration of an image file applied to the printing system;

FIG. 11(B) is an illustrative view showing layout information applied to the printing system;

FIG. 11(C) is an illustrative view showing a configuration of save data applied to the printing system;

FIG. 12 is an illustrative view showing a configuration of a transmission list applied to the printing system;

DETAILED DESCRIPTION OF THE PREFERRED EMBODIMENTS

Figure 1:
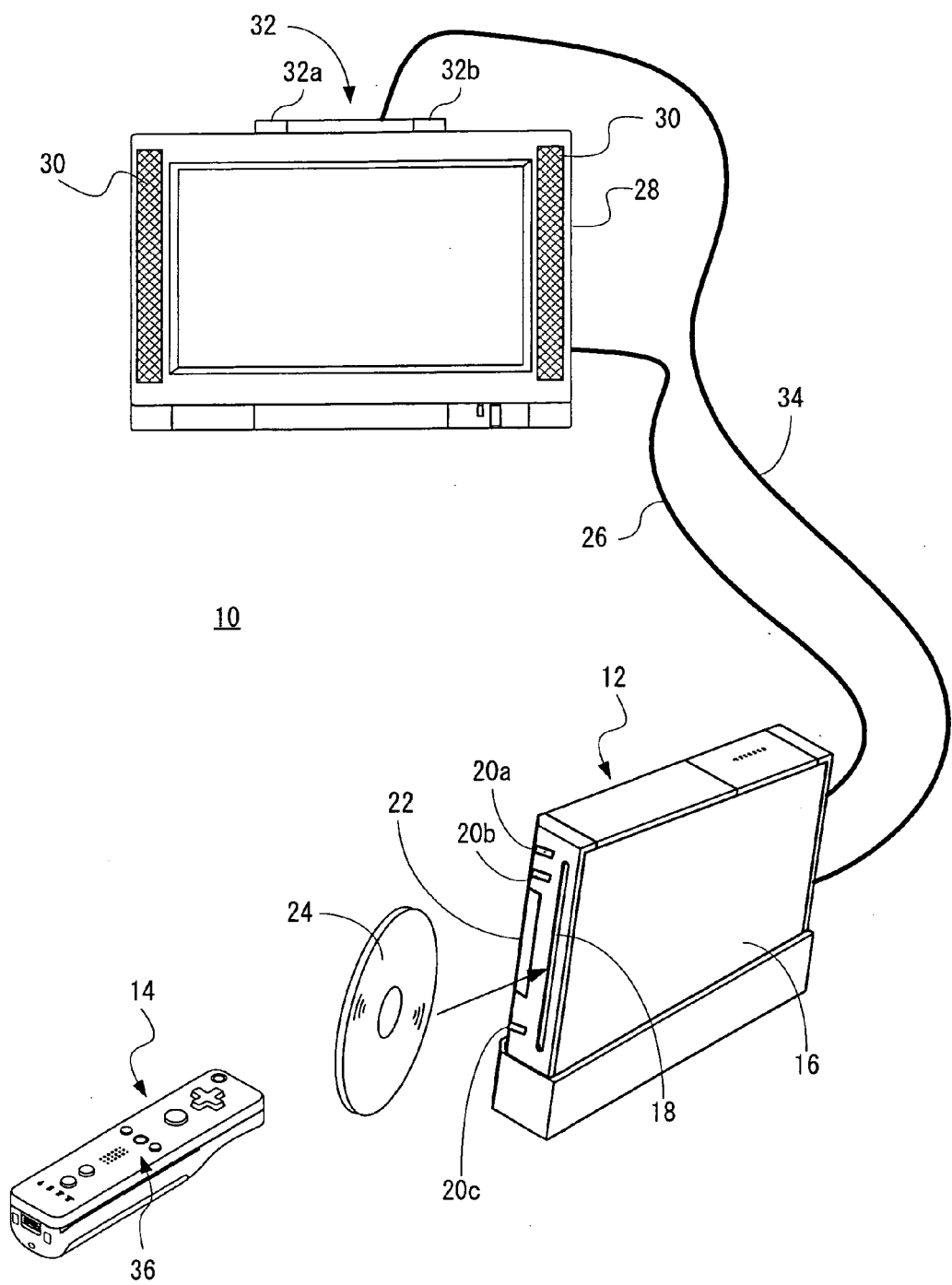
FIG. 1 is an appearance view showing an outline of a game system of one embodiment of the present invention.

Referring to FIG. 1, a game system 10 as one embodiment of the present invention includes a game apparatus 12 and a controller 14. Although illustration is omitted, the game apparatus 12 of this embodiment is designed such that it can be connected to four controllers 14 at the maximum. Furthermore, the game apparatus 12 and the respective controllers 14 are connected by radio. The wireless communication is executed according to a Bluetooth (registered trademark) standard, for example, but may be executed by other standards such as infrared rays, a wireless LAN. In addition, it may be connected by a wire.

The game apparatus 12 includes a roughly rectangular parallelepiped housing 16, and the housing 16 is furnished with a disk slot 18 on a front surface. An optical disk 24 as one example of an information storage medium storing game program, etc. is inserted from the disk slot 18 to be loaded into a disk drive 54 (see FIG. 2) within the housing 16. Although illustration is omitted, around the disk slot 18, an LED and a light guide plate are arranged such that the LED of the disk slot 18 lights on or off in accordance with various processing.

Furthermore, on the front surface of the housing 16 of the game apparatus 12, a power button 20a and a reset button 20b are provided at the upper part thereof, and an eject button 20c is provided below them. In addition, a connector cover for external memory card 22 is provided between the reset button 20b and the eject button 20c, and in the vicinity of the disk slot 18. Inside the connector cover for external memory card 22, an external connector for memory card 62 (see FIG. 2) is provided, through which an external memory card (hereinafter simply referred to as a "memory card 38") not shown is inserted. The memory card 38 is employed for loading the game program, etc. read from the optical disk 24 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card 38. Also, the memory card 38 may be utilized as a backup memory of the internal memory. In addition, in the game apparatus 12, other application except for the game may be executed, and in such a case, data of the other application can be stored in the memory card 38.

It should be noted that a general-purpose SD card can be employed as a memory card 38, but other general-purpose memory cards, such as memory sticks, multimedia cards (registered trademark) can be employed.

Although omitted in FIG. 1, the game apparatus 12 has an AV cable connector 58 (FIG. 2) on the rear surface of the housing 16, and by utilizing the AV cable connector 58, a monitor 28 and a speaker 30 are connected to the game apparatus 12 through an AV cable 26. The monitor 28 and the speaker 30 are typically a color television receiver, and through the AV cable 26, a video signal from the game apparatus 12 is input to a video input terminal of the color television, and a sound signal from the game apparatus 12 is input to a sound input terminal. Accordingly, a three-dimensional game image of a three-dimensional (3D) video game, for example, is displayed on the screen of the color television (monitor) 28, and stereo game sound, such as a game music, a sound effect, etc. is output from right and left speakers 30.

Around the monitor 28 (on the top side of the monitor 28, in this embodiment), a marker unit 32 including two infrared ray LEDs (markers) 32a and 32b is provided. The marker unit 32 is connected to the game apparatus 12 through a power source cable 34. Accordingly, the marker unit 32 is supplied with power from the game apparatus 12. Thus, the markers 32a and 32b emit infrared rays in front of the monitor 28.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 24 storing a program of a video game (or other applications the player wants to play), and loads the optical disk 24 into the disk drive 54 of the game apparatus 12. In response thereto, the game apparatus 12 starts to execute a video game or other applications on the basis of the program recorded in the optical disk 24. The user operates the controller 14 in order to apply an input to the game apparatus 12. For example, by operating any one of the operating buttons of the input means 36 including operating buttons, etc., a game or other application is started. Besides the operation on the input means 36, by moving the controller 14 itself, it is possible to move a moving image object (player object) in different directions or change the perspective of the user (camera position) in a 3-dimensional game world.

It should be noted that programs of video games and other applications are stored (installed) in an internal memory (flash memory 44 (see FIG. 2)) of the game apparatus 12, and executed from the internal memory. In such a case, a program stored in a storage medium like an optical disk 24, or the like may be installed onto the internal memory, and the downloaded program may be installed onto the internal memory.

Figure 2:
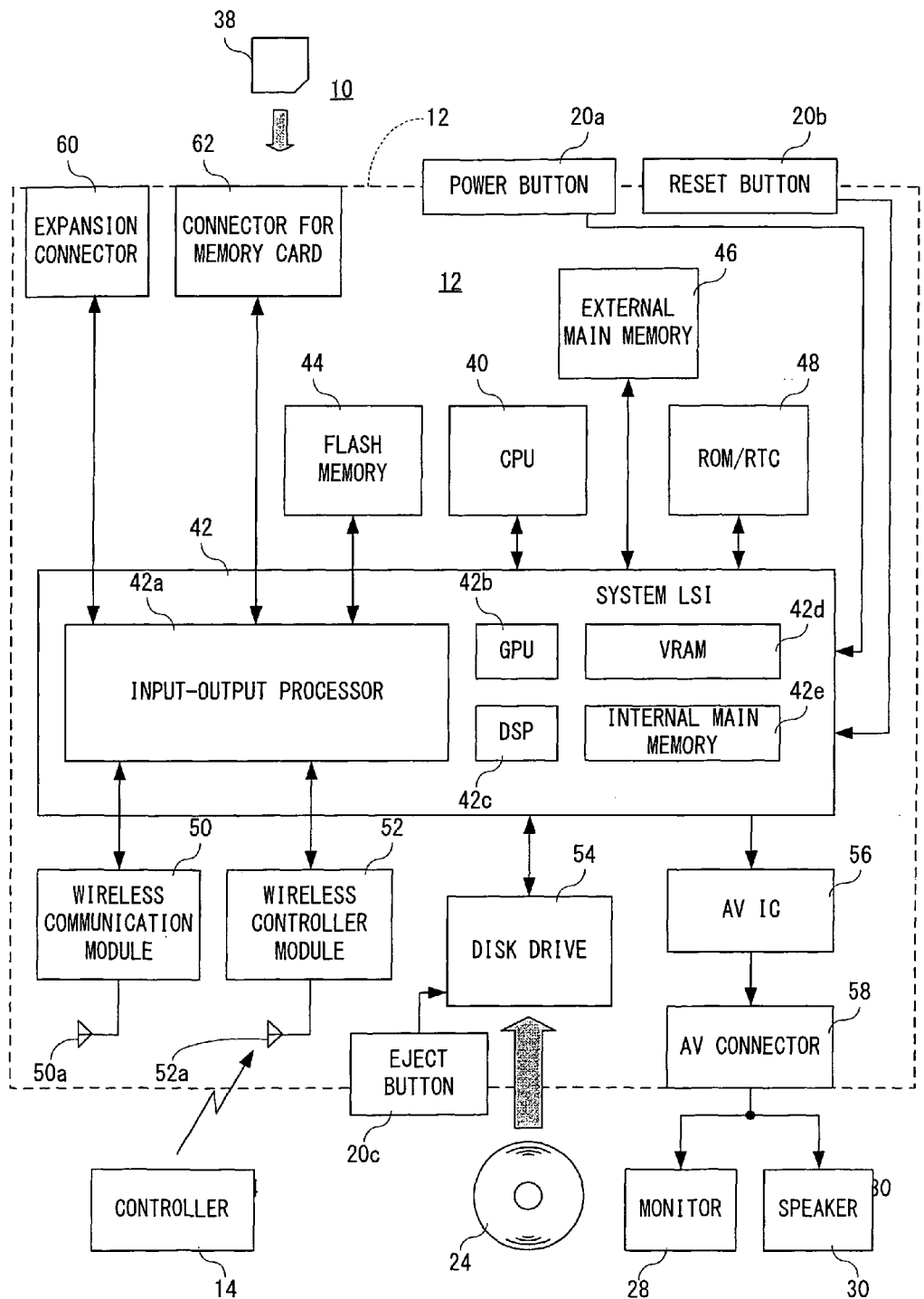
FIG. 2 is a block diagram showing one example of an electric configuration of a game system.

FIG. 2 is a block diagram showing an electric configuration of the game system 10 in FIG. 1 embodiment. Although illustration is omitted, respective components within the housing 16 are mounted on a printed board. As shown in FIG. 2, the game apparatus 12 has a CPU 40 functioning as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads a program, texture data, etc. from the optical disk 24, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with one another by internal buses although illustration is omitted.

The input-output processor (I/O processor) 42a executes transmitting and receiving of data and executes downloading of the data.

The GPU 42b is made up of a part of a rendering means, and receives a graphics command (construction command) from the CPU 40 to generate game image data according to the command. Additionally, the CPU 40 applies an image generating program required for generating game image data to the GPU 42*b* in addition to the graphics command.

Although illustration is omitted, the GPU 42*b* is connected with the VRAM 42*d* as described above. The GPU 42*b* accesses the VRAM 42*d* to acquire data (image data: data such as polygon data, texture data, etc.) required to execute the construction instruction. Additionally, the CPU 40 writes image data required for drawing to the VRAM 42*d* via the GPU 42*b*. The GPU 42*b* accesses the VRAM 42*d* to create game image data for drawing.

In this embodiment, a case that the GPU 42*b* generates game image data is explained, but in a case of executing an arbitrary application except for the game application, the GPU 42*b* generates image data as to the arbitrary application.

Furthermore, the DSP 42*c* functions as an audio processor, and generates audio data corresponding to a sound, a voice, music, or the like to be output from the speaker 30 by means of the sound data and the sound wave (tone) data stored in the internal main memory 42*e* and the external main memory 46.

The game image data and audio data generated as described above are read by the AV IC 56, and output to the monitor 28 and the speaker 30 via the AV connector 58. Accordingly, a game screen is displayed on the monitor 28, and a sound (music) necessary for the game is output from the speaker 30.

Furthermore, the input-output processor 42*a* is connected with a flash memory 44, a wireless communication module 50 and a wireless controller module 52, and is also connected with an expansion connector 60 and a connector for memory card 62. The wireless communication module 50 is connected with an antenna 50*a*, and the wireless controller module 52 is connected with an antenna 52*a*.

The input-output processor 42*a* can communicate with other game apparatuses and various servers to be connected to a network 124 via a wireless communication module 50. It should be noted that it is possible to directly communicate with another game apparatus without going through the network 124. The input-output processor 42*a* periodically accesses the flash memory 44 to detect the presence or absence of data (referred to as data to be transmitted) required to be transmitted to a network 124, and transmits it to the network 124 via the wireless communication module 50 and the antenna 50*a* in a case that data to be transmitted is present. Furthermore, the input-output processor 42*a* receives data (referred to as received data) transmitted from another game apparatuses via the network 124, the antenna 50*a* and the wireless communication module 50, and stores the received data in the flash memory 44. If the received data does not satisfy a predetermined condition, the reception data is abandoned as it is. In addition, the input-output processor 42*a* can receive data (download data) downloaded from the download server (not shown) via the network 124, the antenna 50*a* and the wireless communication module 50, and store the download data in the flash memory 44.

Furthermore, the input-output processor 42*a* receives input data transmitted from the controller 14 via the antenna 52*a* and the wireless controller module 52, and (temporarily) stores it in the buffer area of the internal main memory 42*e* or the external main memory 46. The input data is erased from the buffer area after being utilized in processing (game processing, for example) by the CPU 40.

In this embodiment, as described above, the wireless controller module 52 makes communications with the controller 14 in accordance with Bluetooth standards.

In addition, the input-output processor 42*a* is connected with the expansion connector 60 and the connector for memory card 62. The expansion connector 60 is a connector for interfaces, such as USB, SCSI, etc., and can be connected with medium such as an external storage, and peripheral devices such as another controller other than the controller 14. Furthermore, the expansion connector 60 is connected with a cable LAN adaptor, and can utilize the cable LAN in place of the wireless communication module 50. The connector for memory card 62 can be connected with an external storage like a memory card. Thus, the input-output processor 42*a*, for example, accesses the external storage via the expansion connector 60 and the connector for memory card 62 to store and read the data.

Although a detailed description is omitted, as shown in FIG. 1, the game apparatus 12 (housing 16) is furnished with the power button 20*a*, the reset button 20*b*, and the eject button 20*c*. The power button 20*a* is connected to the system LSI 42. When the power button 20*a* is turned on, the system LSI 42 is set in a mode of a normal energized state (referred to as "normal mode") in which the respective components of the game apparatus 12 are supplied with power through an AC adapter not shown. On the other hand, when the power button 20*a* is turned off, the system LSI 42 is set to a mode in which a part of the components of the game apparatus 12 is supplied with power, and the power consumption is reduced to minimum (hereinafter referred to as "standby mode").

In this embodiment, in a case that the standby mode is set, the system LSI 42 issues an instruction to stop supplying the power to the components except for the input-output processor 42*a*, the flash memory 44, the external main memory 46, the ROM/RTC 48 and the wireless communication module 50, and the wireless controller module 52. Accordingly, in this embodiment, the CPU 40 never executes an application in the stand-by mode.

Although the system LSI 42 is supplied with power even in the standby mode, supply of clocks to the GPU 42*b*, the DSP 42*c* and the VRAM 42*d* are stopped so as not to be driven, realizing reduction in power consumption.

Although illustration is omitted, inside the housing 16 of the game apparatus 12, a fan is provided for excluding heat of the IC, such as the CPU 40, the system LSI 42, etc. to outside. In the standby mode, the fan is also stopped.

However, in a case that the standby mode is not desired to be utilized, when the power button 20*a* is turned off, by making the standby mode unusable, the power supply to all the circuit components are completely stopped.

Furthermore, switching between the normal mode and the standby mode can be performed by turning on and off the power switch 86 (FIG. 3) of the controller 14 by remote control. If the remote control is not performed, setting is made such that the power supply to the wireless controller module 52 is not performed in the standby mode.

The reset button 20*b* is also connected with the system LSI 42. When the reset button 20*b* is pushed, the system LSI 42 restarts the activation program of the game apparatus 12. The eject button 20*c* is connected to the disk drive 54. When the eject button 20*c* is pushed, the optical disk 24 is removed from the disk drive 54.

Each of FIG. 3(A) to FIG. 3(B) shows one example of an external appearance of the controller 14. FIG. 3(A) is a perspective view showing a front end surface, a top surface and a right side surface of the controller 14, and FIG. 3(B) is a perspective view showing a back end surface, a lower surface and a left side surface of the controller 14.

Referring to FIG. 3(A) and FIG. 3(B), the controller 14 has a housing 70 formed by plastic molding, for example. The housing 70 is formed into an approximately rectangular parallelepiped shape and has a size small enough to be held by one hand of a user. The housing 70 (controller 14) is provided with the input means (a plurality of buttons or switches) 36 as described above. Specifically, as shown in FIG. 3(A), on an upper face of the housing 70, there are provided a cross key 72, a 1 button 74, a 2 button 76, an A button 78, a − (minus) button 80, a HOME button 80, a +(plus) button 84 and a power switch 86. Moreover, as shown in FIG. 3 (B), an inclined surface is formed on a lower surface of the housing 70, and a B-trigger switch 88 is formed on the inclined surface.

The cross key 72 is a four directional push switch, including four directions of front (or upper), back (or lower), right and left operation parts. By operating any one of the operation parts, it is possible to instruct a moving direction of a character or an object (player character or player object) that is operable by a player or instruct a moving direction of a cursor.

The 1 button 74 and the 2 button 76 are respectively push button switches, and are used for a game operation such as adjusting a viewpoint position and a viewpoint direction on displaying the 3D game image, i.e. a position and an image angle of a virtual camera. Alternatively, the 1 button 74 and the 2 button 76 can be used for an operation the same as that of the A button 78 and the B-trigger switch 88 or an auxiliary operation.

The A-button switch 78 is the push button switch, and is used for causing the player character or the player object to take an action other than a direction instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Furthermore, the A button 78 is used for instructing decision of an icon or a button image pointed by the pointer (instruction image) on the game screen. For example, when the icon and the button image are decided, an instruction or a command (command of the game) set in advance corresponding thereto can be input.

The − button 80, the HOME button 82, the + button 84, and the power supply switch 86 are also push button switches. The − button 80 is used for selecting a game mode. The HOME button 82 is used for displaying a game menu (menu screen). The + button 84 is used for starting (re-starting) or pausing a game. The power supply switch 86 is used for turning on and off a power supply of the game apparatus 12 by remote control.

In this embodiment, note that the power supply switch for turning on/off the controller 14 itself is not provided, and the controller 14 is set at on-state by operating any one of the switches or buttons of the input means 36 of the controller 14, and when not operated for a certain period of time (30 seconds, for example) or more, the controller 14 is automatically set to an off-state.

The B-trigger switch 88 is also the push button switch, and is mainly used for making an input like a trigger such as shooting, and designating a position selected by the controller 14. In a case that the B-trigger switch 88 is continued to be pushed, it is possible to make movements and parameters of the player object constant. In a fixed case, the B-trigger switch 88 functions in the same way as a normal B-button, and is used for canceling an action or a command determined by the A button 78.

As shown in FIG. 3(A), an external expansion connector 90 is provided on a back end surface of the housing 70, and as shown in FIG. 3(B), an indicator 92 is provided on the top surface and on the side of the back end surface of the housing 70. The external expansion connector 90 is utilized for connecting another expansion controller not shown different from the controller 14. The indicator 92 is made up of four LEDs, for example, and shows identification information (controller number) of the controller 14 by lighting any one of the four LEDs and depending on the lighted LED, and the indicator 92 shows the remaining amount of power of the controller 14 depending on the number of LEDs to be lit up.

In addition, the controller 14 has an imaged information arithmetic section 108 (see FIG. 4), and as shown in FIG. 3(B), a light incident opening 94 of the imaged information arithmetic section 108 is provided on the front end surface of the housing 70. Furthermore, the controller 14 has a speaker 114 (see FIG. 4), and the speaker 114 is provided inside the housing 70 at the position corresponding to a sound release hole 96 between the 1 button 74 and the HOME button 82 on the tope surface of the housing 70 as shown in FIG. 3(A).

Note that as shown in FIG. 3(A) to FIG. 3(B), the shape of the controller 14 and the shape, number and setting position of each input means 36 are simply examples, and they may be modified as necessary.

Figure 4:
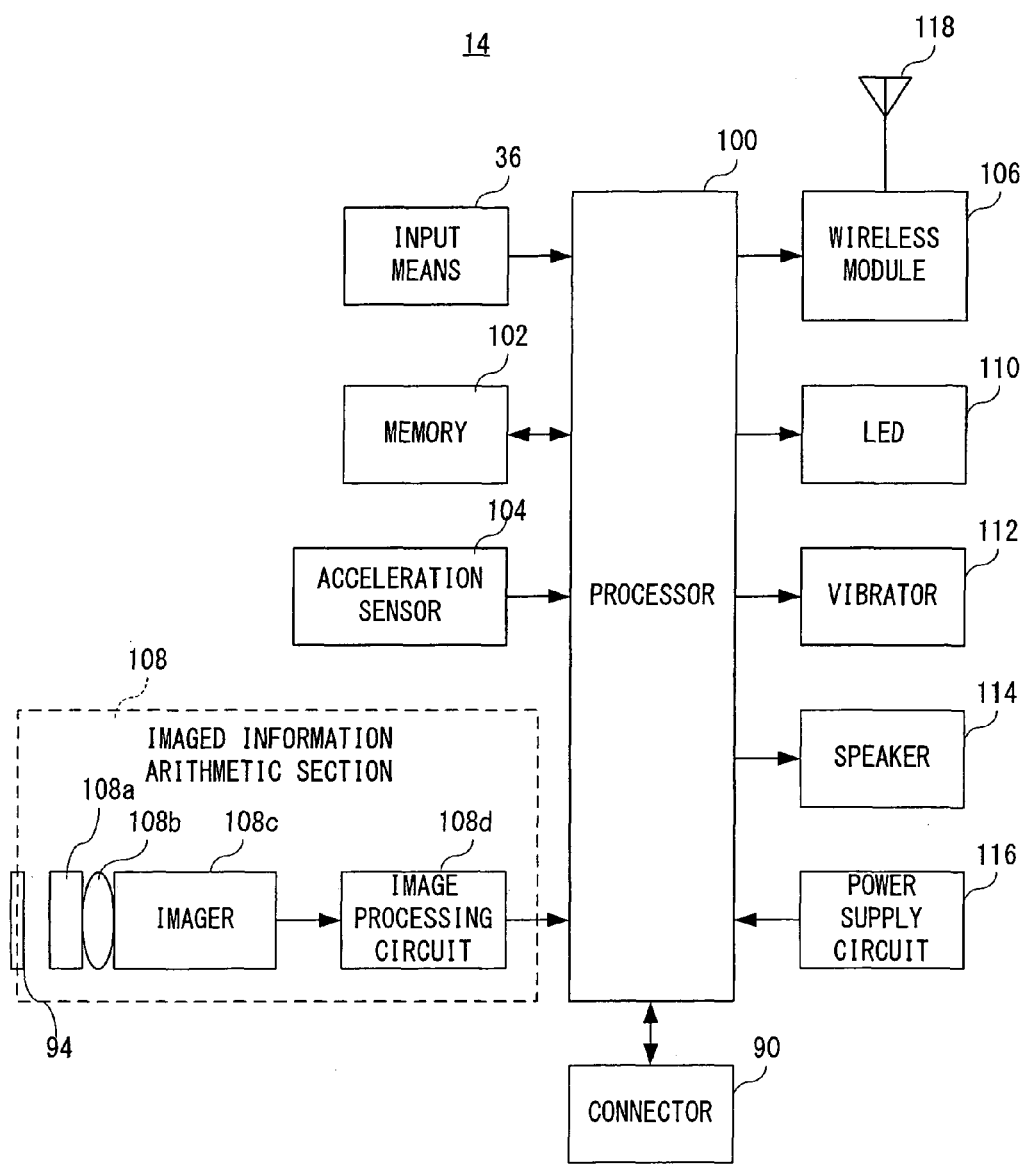
FIG. 4 is a block diagram showing one example of an electric configuration of the controller.

FIG. 4 is a block diagram showing an electric configuration of the controller 14. Referring to FIG. 4, the controller 14 includes a processor 100, and the processor 100 is connected with the external expansion connector 90, the input means 36, a memory 102, an acceleration sensor 104, a wireless module 106, the imaged information arithmetic section 108, an LED 110 (the indicator 92), an vibrator 112, a speaker 114, and a power supply circuit 116 by an internal bus (not shown). Moreover, an antenna 118 is connected to the wireless module 106.

It should be noted that although omitted in FIG. 4, the indicator 92 is made up of four LEDs 110 as described above.

The processor 100 is in charge of an overall control of the controller 14, and transmits (inputs) information (input information) input by the input means 36, the acceleration sensor 104, and the imaged information arithmetic section 108 as input data to the game apparatus 12 via the wireless module 106 and the antenna 118. At this time, the processor 100 uses the memory 102 as a working area or a buffer area. An operation signal (operation data) from the aforementioned input means 36 (72-84) is input to the processor 100, and the processor 100 stores the operation data once in the memory 102.

Moreover, as shown in FIG. 3, the acceleration sensor 104 detects each acceleration of the controller 14 in directions of three axes of vertical direction (y-axial direction), lateral direction (x-axial direction), and forward and rearward directions (z-axial direction). The acceleration sensor 104 is typically an acceleration sensor of an electrostatic capacity type, but the acceleration sensor of other type may also be used.

For example, the acceleration sensor 104 detects the accelerations (ax, ay, az) in each direction of x-axis, y-axis, z-axis for each first predetermined time, and inputs the data of the acceleration (acceleration data) thus detected to the processor 100. For example, the acceleration sensor 104 detects the acceleration in each direction of the axes in a range from −2.0 G to 2.0 G (G indicates a gravitational acceleration. The same thing can be the hereafter.) The processor 100 detects the acceleration data given from the acceleration sensor 104 for each second predetermined time, and stores it in the memory 102 once.

The processor 100 creates input data including at least one of the operation data, acceleration data and marker coordinate data as described later, and transmits the input data thus created to the game apparatus 12 for each third predetermined time (5 msec, for example).

In this embodiment, although omitted in FIG. 3, the acceleration sensor 104 is provided inside the housing 70 and in the vicinity on the circuit board where the cross key 72 is arranged.

It will be appreciated by those skilled in the art from the description of this specification that a computer, such as a processor (CPU 40, for example) of the game apparatus 12 or the processor (processor 100, for example) of the controller 14 executes processing on the basis of acceleration data output from the acceleration sensors 104 to thereby estimate or calculate (determine) more information relating to the controller 14.

The controller 14 is incorporated with the single axis acceleration sensor 104, for example, and in a case that processing is executed on the side of the computer assuming that the controller 14 is in a static state, that is, processing is executed considering that accelerations detected by the acceleration sensor 104 is only gravitational accelerations, if the controller 14 is actually in a static state, it is possible to know whether or not the orientations of the controller 14 is inclined with respect to the direction of gravity or to what extent they are inclined on the basis of the detected acceleration. More specifically, when a state in which the detection axis of the acceleration sensor 104 is directed to a vertically downward direction is taken as a reference, merely whether or not 1 G (gravitational acceleration) is imposed on can show whether or not the controller 14 is inclined, and the size can show to what extent it is inclined.

Furthermore, if a multi-axes acceleration sensor 104 is mounted on the controller 14, by further performing processing on the acceleration data of each axis, it is possible to more precisely know to what extent the controller 14 is inclined with respect to the direction of gravity. In this case, on the basis of the outputs from the acceleration sensor 104, the processor 100 may perform processing of calculating data of inclined angle of the controller 14, but perform processing of estimating an approximate inclination on the basis of the outputs from the acceleration sensor 104 without performing the processing of calculating the data of the inclined angle. Thus, by using the acceleration sensor 104 in conjunction with the processor 100, it is possible to determine an inclination, an orientation or a position of the controller 14.

On the other hand, assuming that the acceleration sensor 104 are in a dynamic state, accelerations according to the movement of the acceleration sensor 104 is detected in addition to the gravitational acceleration component, and therefore, if the gravitational acceleration component is removed by predetermined processing, it is possible to know a moving direction, etc. More specifically, in a case that the controller 14 being furnished with the acceleration sensor 104 is accelerated and moved by the hand of the user, acceleration data generated by the acceleration sensor 104 is processed, and whereby, it is possible to calculate various movements and/or positions of the controller 14.

Additionally, even when assuming that the acceleration sensor 104 is in a dynamic state, if an acceleration in correspondence with the movement of the acceleration sensor 104 is removed by the predetermined processing, it is possible to know the inclination with respect to the direction of gravity. In another embodiment, the acceleration sensor 104 may contain a built-in signal processing apparatus or other kinds of dedicated processing apparatuses for performing desired processing on the acceleration signal (acceleration data) output from the incorporated acceleration detecting means before outputting the acceleration signal to the processor 100. For example, in a case that the acceleration sensor 104 is one for detecting a static acceleration (gravitational acceleration, for example), the built-in or dedicated processing apparatuses may be one for transforming the detected acceleration data into the inclined angle (or other preferable parameters) corresponding thereto.

The wireless module 106 modulates a carrier at a predetermined frequency by the input data, by using a technique of Bluetooth, for example, and emits its weak radio wave signal from the antenna 118. Namely, the input data is modulated to the weak radio wave signal by the wireless module 106 and transmitted from the antenna 118 (controller 14). The weak radio wave signal is received by the wireless controller module 52 provided to the aforementioned game apparatus 12. The weak radio wave thus received is subjected to demodulating and decoding processing. This makes it possible for the game apparatus 12 (CPU 40) to acquire the input data from the controller 14. Then, the CPU 40 performs processing of an application (game processing), following the obtained input data and the application program (game program).

In addition, as described above, the controller 14 is provided with the imaged information arithmetic section 108. The imaged information arithmetic section 108 is made up of an infrared rays filter 108a, a lens 108b, an imager 108c, and an image processing circuit 108d. The infrared rays filter 108a passes only infrared rays from the light incident from the front of the controller 14. As described above, the markers 32a and 32b placed near (around) the display screen of the monitor 28 are infrared LEDs for outputting infrared lights forward the monitor 28. Accordingly, by providing the infrared rays filter 108a, it is possible to image the image of the markers 32a and 32b more accurately. The lens 108b condenses the infrared rays passing thorough the infrared rays filter 108a to emit them to the imager 108c. The imager 108c is a solid imager, such as a CMOS sensor and a CCD, for example, and images the infrared rays condensed by the lens 108b. Accordingly, the imager 108c images only the infrared rays passing through the infrared rays filter 108a to generate image data. Hereafter, the image imaged by the imager 108c is called an "imaged image". The image data generated by the imager 108c is processed by the image processing circuit 108d. The image processing circuit 108d calculates a position of an object to be imaged (markers 32a and 32b) within the imaged image, and outputs each coordinate value indicative of the position to the processor 100 as imaged data (marker coordinates data to be described later) for each fourth predetermined time. It should be noted that a description of the process in the image processing circuit 108d is made later.

FIG. 5 is an illustrative view summarizing a state when a player plays a game by utilizing the controller 14. As shown in FIG. 5, when playing the game by means of the controller 14 in the game system 10, the player holds the controller 14 with the palm of one hand in a state that a strap 120 tied at one end of the controller 14 is wound around the wrist of the same hand. Strictly speaking, the player holds the controller 14 in a state that the front end surface (the side of the incident light opening 94 of the light imaged by the imaged information arithmetic section 108 shown in FIG. 3) of the controller 14 is oriented to the markers 32a and 32b. It should be noted that the markers 32a and 32b are placed in parallel with the lateral (horizontal) direction of the screen of the monitor 28 as illustrated. In this state, the player performs a game operation by changing a position on the screen indicated by the controller 14 and changing a distance between the controller 14 and each of the markers 32a and 32b.

Figure 6:
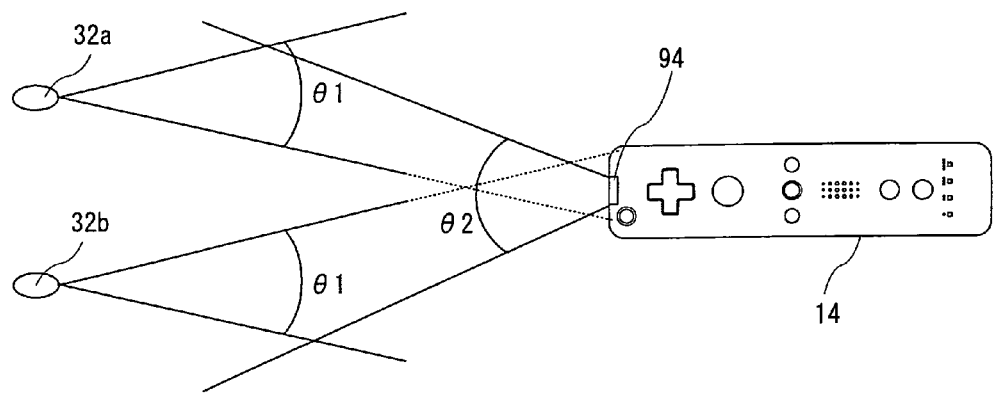
FIG. 6 is an illustrative view showing viewing angles of markers and the controller in the game system.

FIG. 6 is a view showing viewing angles between the respective markers 32a and 32b, and the controller 14. As shown in FIG. 6, each of the markers 32a and 32b emits infrared ray within a range of a viewing angle $\theta 1$. Also, the imager 108c of the imaged information arithmetic section 108 can receive incident light within the range of the viewing angle θ2 taking the line of sight of the controller 14 as a center. For example, the viewing angle θ1 of each of the markers 32a and 32b is 34° (half-value angle) while the viewing angle θ2 of the imager 108c is 41°. The player holds the controller 14 such that the imager 108c is directed and positioned so as to receive the infrared rays from the markers 32a and 32b. More specifically, the player holds the controller 14 such that at least one of the markers 32a and 32b exists in the viewing angle θ2 of the imager 108c, and the controller 14 exists in at least one of the viewing angles θ1 of the marker 32a or 32b. In this state, the controller 14 can detect at least one of the markers 32a and 32b. The player can perform a game operation by changing the position and the orientation of the controller 14 in the range satisfying the state.

If the position and the orientation of the controller 14 are out of the range, the game operation based on the position and the orientation of the controller 14 cannot be performed. Hereafter, the above-described range is called an "operable range."

Figure 7:
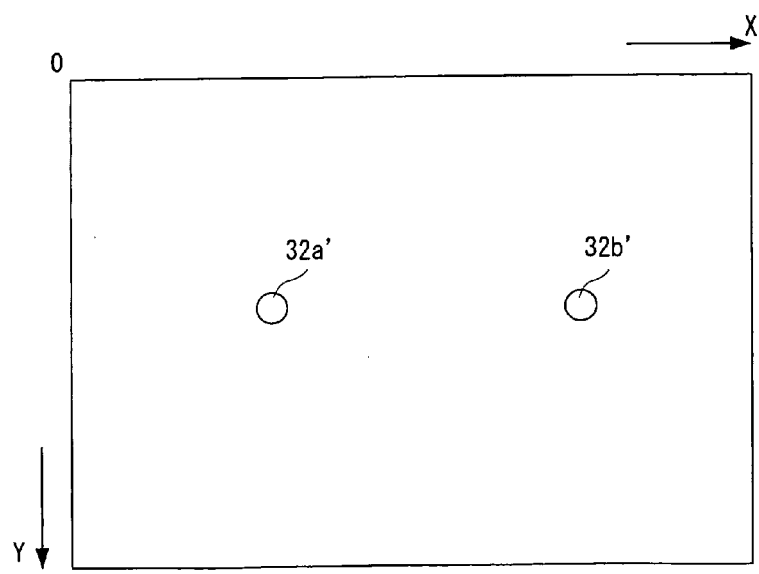
FIG. 7 is an illustrative view showing one example of an imaged image including images of the markers (object images)

If the controller 14 is held within the operable range, an image of each of the markers 32a and 32b is imaged by the imaged information arithmetic section 108. That is, the imaged image obtained by the imager 108c includes an image (object image) of each of the markers 32a and 32b as an object to be imaged. FIG. 7 is a view showing one example of the imaged images including an object image. The image processing circuit 108d calculates coordinates (marker coordinates) indicative of the position of each of the markers 32a and 32b in the imaged image by utilizing the image data of the imaged image including the object images. It should be noted that the coordinates calculated here are according to a world coordinate system (X-Y coordinate system: described below) taking the upper left edge of the imaged image (game screen) as an origin point O.

Since each of the object images appears as a high-intensity part in the image data of the imaged image, the image processing circuit 108d first detects the high-intensity part as a candidate of the object image. Next, the image processing circuit 108d determines whether or not the high-intensity part is an object image on the basis of the size of the detected high-intensity part. The imaged image may include images other than the object image due to sunlight through a window and light of a fluorescent lamp in the room as well as the images 32a' and 32b' corresponding to the two markers 32a and 32b as an object image. The determination processing whether or not the high-intensity part is an object image is executed for discriminating the images 32a' and 32b' of the two markers 32a and 32b as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 108d calculates the position of the high-intensity part. More specifically, the barycenter position of the high-intensity part is calculated. Here, the coordinates of the barycenter position is called "marker coordinates". Also, the barycenter position can be calculated with more detailed scale than the resolution of the imager 108c. Now, the resolution of the imaged image imaged by the imager 108c shall be 126×96, and the barycenter position shall be calculated with the scale of 1024×768. That is, the marker coordinates are represented by the integer from (0, 0) to (1024, 768).

Additionally, the position in the imaged image shall be represented by a coordinate system (X-Y coordinate system) taking the upper left of the imaged image as an origin point, the downward direction as an Y-axis positive direction, and the right direction as an X-axis positive direction.

Also, if each of the object images is properly detected, two high-intensity parts are determined as object images by the determination process, and therefore, two marker coordinates are calculated. The image processing circuit 108d outputs data indicative of the calculated two markers coordinates. The data of the output marker coordinates (marker coordinate data) is included in the input data by the processor 100 as described above, and transmitted to the game apparatus 12.

The game apparatus 12 (CPU 40) detects the marker coordinate data from the received input data to thereby calculate an instructed position P (instructed coordinate PX, PY) by the controller 14 on the screen of the monitor 28 and a distance from the controller 14 to each of the markers 32a and 32b on the basis of the marker coordinate data. More specifically, from the position of the mid point of the two marker coordinates, a position to which the controller 14 faces, that is, an instructed position is calculated. The distance between the object images in the imaged image is changed depending on the distance between the controller 14 and each of the markers 32a and 32b, and therefore, the game apparatus 12 can grasp the distance between the controller 14 and each of the markers 32a and 32b by calculating the distance between the two marker coordinates.

The game system 10 constructed described above also functions as an image transmitting apparatus (client) for transmitting an image such as a photograph, a character, etc. recorded in the memory card 38 to a printer (server).

Figure 8:
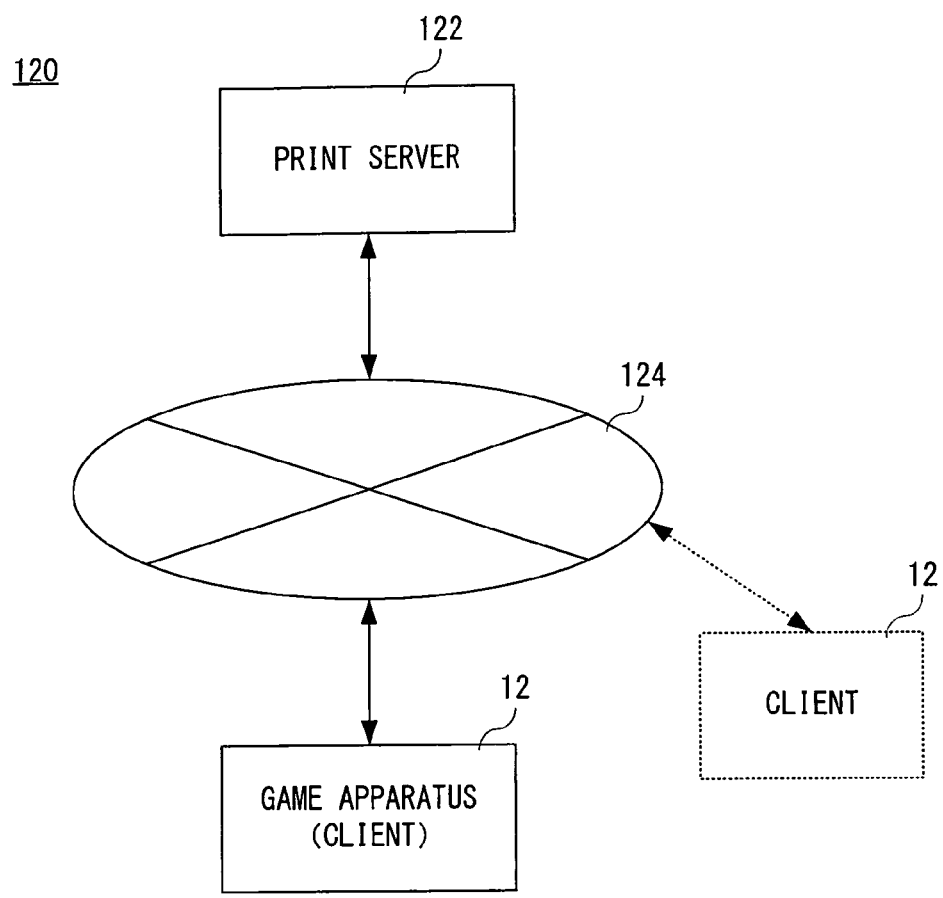
FIG. 8 is a block diagram showing one example of a printing system including a game system as a client.

FIG. 8 shows one example of a printing system 120 utilizing the game system 10. Referring to FIG. 8, the printing system 120 includes the game system 10 and a print server 122. The game system 10 is connected to the print server 122 via the network 124, such as the Internet, a LAN, etc. When the memory card 38 is attached to the connector for memory card 62 of the game apparatus 12 to allow selection of a desired image from the images recorded in the memory card 38, the selected image is transmitted from the wireless communication module 50 to the print server 122 via the network 124. The print server 122 receives the image from the game system 10 and then prints the same in a sheet of paper such as a photographic paper, a business card, etc.

Figure 9:
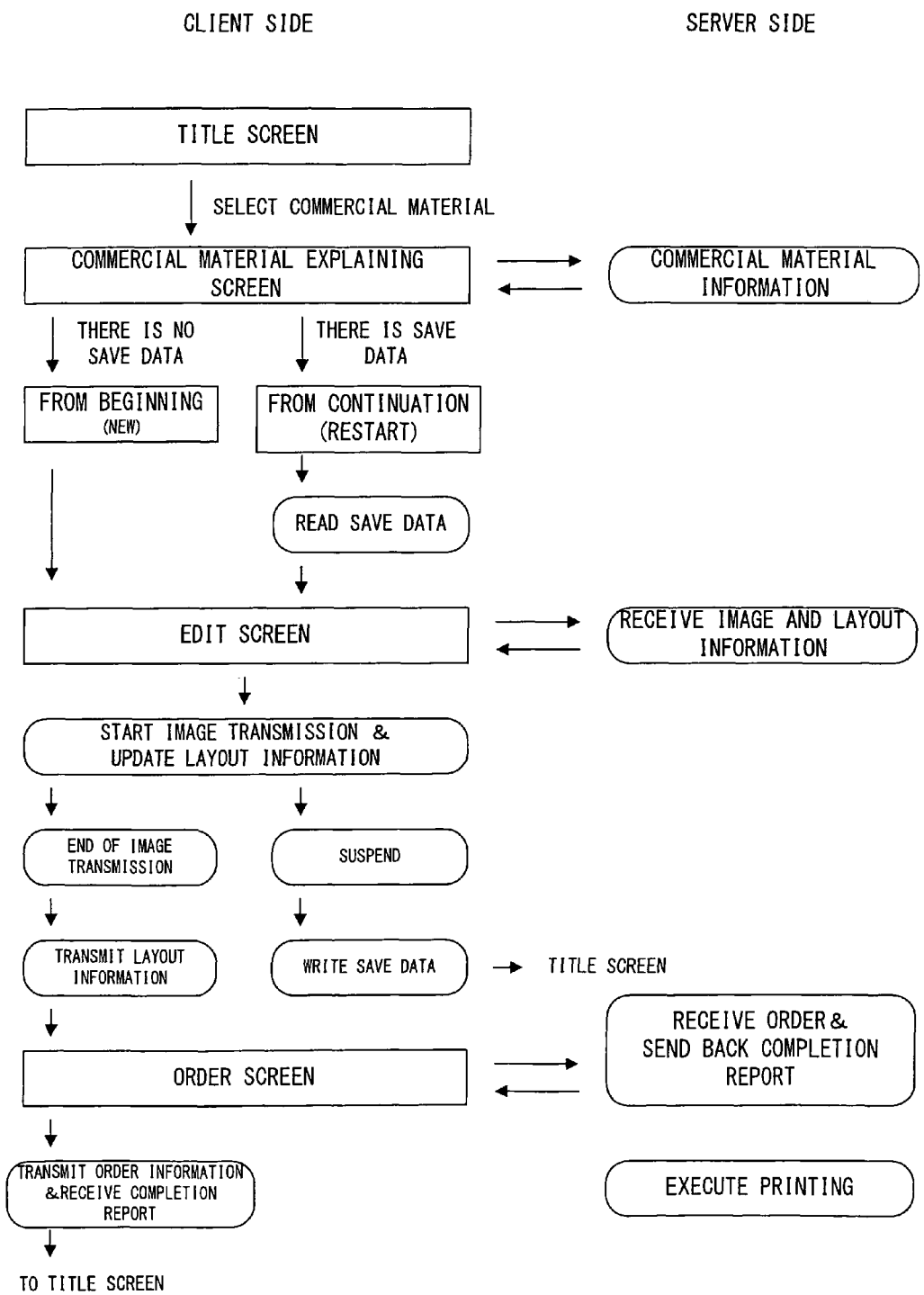
FIG. 9 is a sequence diagram explaining an outline of print processing by the printing system on a client side and a server side.

FIG. 9 shows an outline of print processing by the printing system 120. Referring to FIG. 9, on the client side, that is, in the game system 10, an image transmitting mode is selected by the controller 14 to display a title screen (not illustrated) on the monitor 28. The title screen includes a plurality of commercial material names, such as "A4 album", "L-sized print", and "business card" as alternatives, and when any one of them is selected, an ID of the selected commercial material is notified to the server side, that is, the print server 122. The print server 122 provides commercial material information corresponding to the notified ID to the client side.

On the client side, in response to the reception of the commercial material information, the display on the monitor 28 is switched from the title screen to a commercial material explaining screen (not illustrated). When an OK operation is performed by the controller 14 here, the display on the monitor 28 is switched from the commercial material explaining screen to an edit display (see FIG. 13). At this time, the presence or absence of save data (described later) is determined, and if there is save data, editing work and/or image transmitting processing is executed from "the continuation". On the other hand, if there is no save data, the editing work and/or image transmitting processing is executed from "the beginning".

Figure 13:
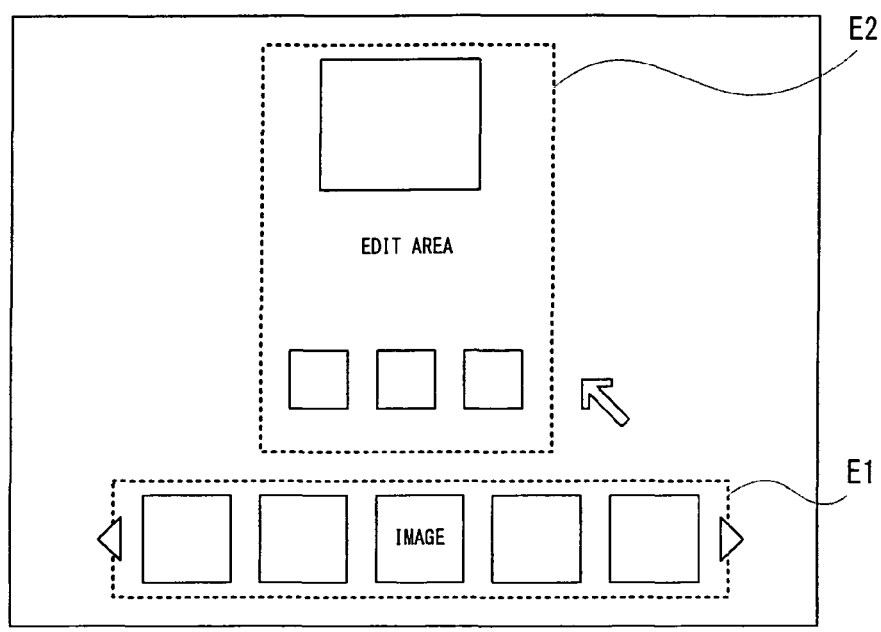
FIG. 13 is an illustrative view showing one example of an edit screen on the client side.

The edit display includes a selection area E1 and an edit area E2 as shown in FIG. 13. The image read from the memory card 38 is placed in the selection area E1 at first. When the user selects a desired image out of the images within the selection area E1 with the controller 14, the selected image is moved to the edit area E2. Next, when the user performs an editing work on the image within the edit area E2 with the controller 14, the image within the edit area E2 is subjected to the corresponding processing, that is, an editing processing such as a movement, enlargement/reduction, trimming, addition of background/foreground, writing of picture/letter.

If the "A4 album" is selected as a commercial material, the edit area E2 corresponds to one page of an album. The user first selects an image to be pasted on the page from the selection area E1 in order. The selected image is moved to a predetermined position, that is, a position in the vicinity of the lower end of the edit area E2. The user next performs an editing work targeted at the image within the edit area E2. More specifically, each image is moved to a desired position by dragging to thereby adjust the data in size and attach a comment, and so forth. Furthermore, as an example of a selecting operation other than the dragging operation, a frame is arranged in advance within the edit area E2, and at a time when an image within the selection area E1 is designated, the image may be arranged within the frame in the edit area E2. A progress or result of the editing work is stored in a layout information area 146 (see FIG. 10) of the internal memory 42*e* as layout information.

On the other hand, in parallel with the editing work as described above, the object to be edited, that is, the image rearranged within the edit area E2 is transmitted to the server side. Such image transmitting processing is started at a time when the object to be edited is selected. Accordingly, in a case that a plurality of images are selected in order, when a first image is selected, a transmission of the image is started. Then, when the transmission of the first image is completed, if a second image onward has already been selected, a transmission of the second image onward is continuously executed.

That is, on the client side, layout information & edit display update processing for updating layout information and an edit display in correspondence with the progress of the editing work and image transmitting processing for transmitting the image as an object of the editing work to the server side are executed in parallel with each other. Layout information transmitting processing for transmitting layout information to the server side is executed after the editing work is completed, that is, the layout of the objective image is decided. On the server side, the image and layout information thus transmitted from the client are received, and printing processing of the image is executed on the basis of the layout information (see FIG. 18: described later).

By transmitting the objective image in the background during the editing work, at a time when the editing work is completed, at least a part of the objective image has already been transmitted, so that after the editing work, the rest of the parts of the objective image which has not yet been transmitted and the layout information may be transmitted. Thus, it is possible to cut a time necessary from the start of the editing to the completion of the transmission (or a standby time from the completion of the editing to the completion of the transmission) in comparison with a case that all the object images and the layout information are transmitted after the editing work.

In a case that the editing work and/or image transmitting processing is suspend due to another work interposing during the editing work, due to the change of a communication state of the network 124, or in a case that an suspension is instructed by an instruction from the user, save data including layout information and a transmission list (see FIG. 12: described later) stored at this point in a transmission list area 144 and the layout information area 146 is produced. The produced save data is held in a save data area 148 (see FIG. 10) within the internal memory 42*e*.

The save data saved in the save data area 148 is utilized when the suspended editing work and/or image transmitting processing is restarted thereafter. That is, since the layout information and the transmission list included in the save data are transferred to the transmission list area 144 and the layout information area 146, respectively, it is possible to minimize waste of starting the editing work and/or image transmitting processing again from the top each suspension.

The transmission list includes an image ID, a transmission object flag and a transmission termination flag as shown in FIG. 12. The image ID is an identifier assigned to each image read from the memory card 38, and serial numbers 0, 1, 2, . . . , 999 according to a reading order is used as an image ID in this embodiment. The transmission object flag is a flag to show whether or not each image is an object to be transmitted, and changes between "0" indicating that each image is not an object to be transmitted and "1" indicating that each image is an object to be transmitted. The transmission termination flag is a flag showing whether or not each image has already been transmitted, and changes between "0" indicating that each image has not yet been transmitted and "1" indicating that each image has already been transmitted.

After completion of transmitting the image and the layout information, the display on the monitor 28 is switched from the edit display to an order screen (not illustrated) on the client side. Through the order screen, a confirmation of a price, a designation of a destination to be delivered, a selection of a payment method, etc. are performed. After the order is decided, order information is transmitted to the server side. On the server side, order processing is executed, and after completion of the processing, a completion report is sent back to the client side. The processing on the client side is ended at a time when the completion report is arrived.

On the server side, processing of creating an image for printing (an image of each page of an album, for example) on the basis of the image and the layout information received from the client side, and outputting the same to a photographic paper, etc. is performed. The image print thus finished is delivered to the designated destination on the basis of the order information received from the client side.

Figure 10:
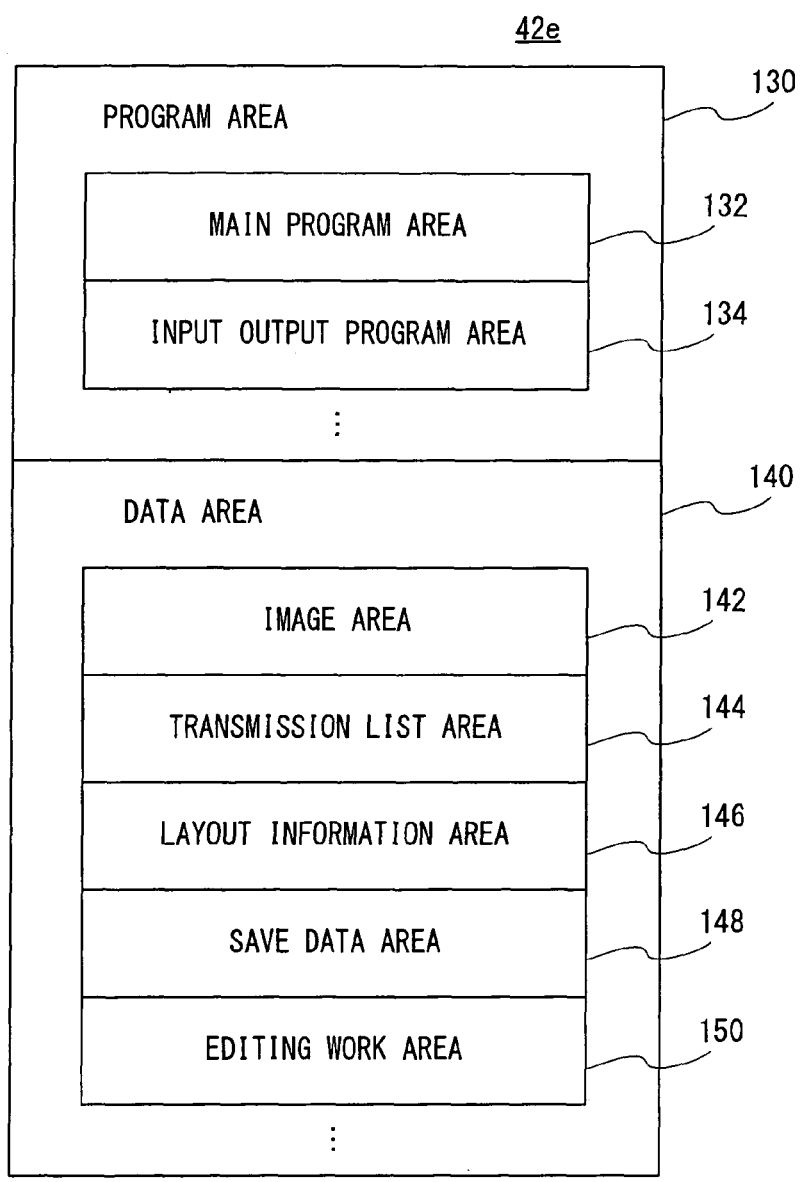
FIG. 10 is an illustrative view showing one example of a memory map of an internal memory on the client side.

FIG. 10 shows a memory map of the client side, specifically, a memory map of the internal memory 42*e* of the game apparatus 12 when the print processing described above is executed. Referring to FIG. 10, a program area 130 includes a main program area 132 storing a main program, an input/output program area 134 storing an input/output program. The main program is a program for executing print processing by controlling the CPU 40, and the input/output program is a program for executing input/output processing in relation to the print processing, such as reception of input data from the controller 14, a communication with the print server 122, etc. by controlling the input-output processor 42*a*.

A data area 140 includes an image area 142 storing an image read from the memory card 38, a transmission list area 144 storing a transmission list, the layout information area 146 storing layout information, the save data area 148 storing save data, an editing work area 150 for editing work, etc.

Here, the image is managed by a format of an image file, such as JPEG, etc. as shown in FIG. 11(A). The image file includes file information (file name, creation date and time, for example), an image ID, image data, etc. The layout information includes at leas an image ID, positional data and size data as shown in FIG. 11(B). As other layout information, angle data, a foreground/background identifier, text/graphic data, etc. are included. The save data includes file information, layout information and a transmission list as shown in FIG. 11(C).

Figure 14:
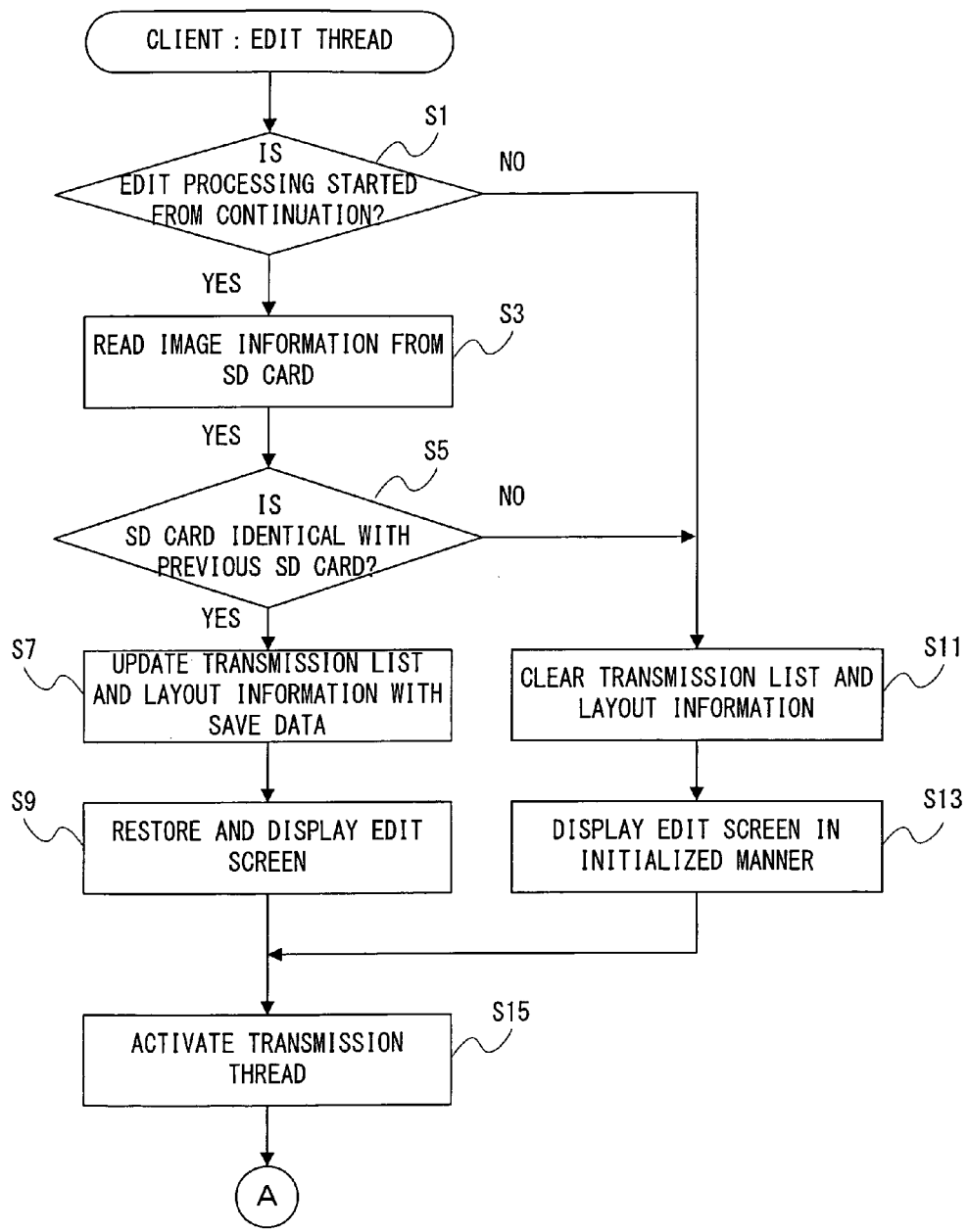
FIG. 14 is a flowchart showing a part of an operation of a CPU on the client side.
Figure 15:
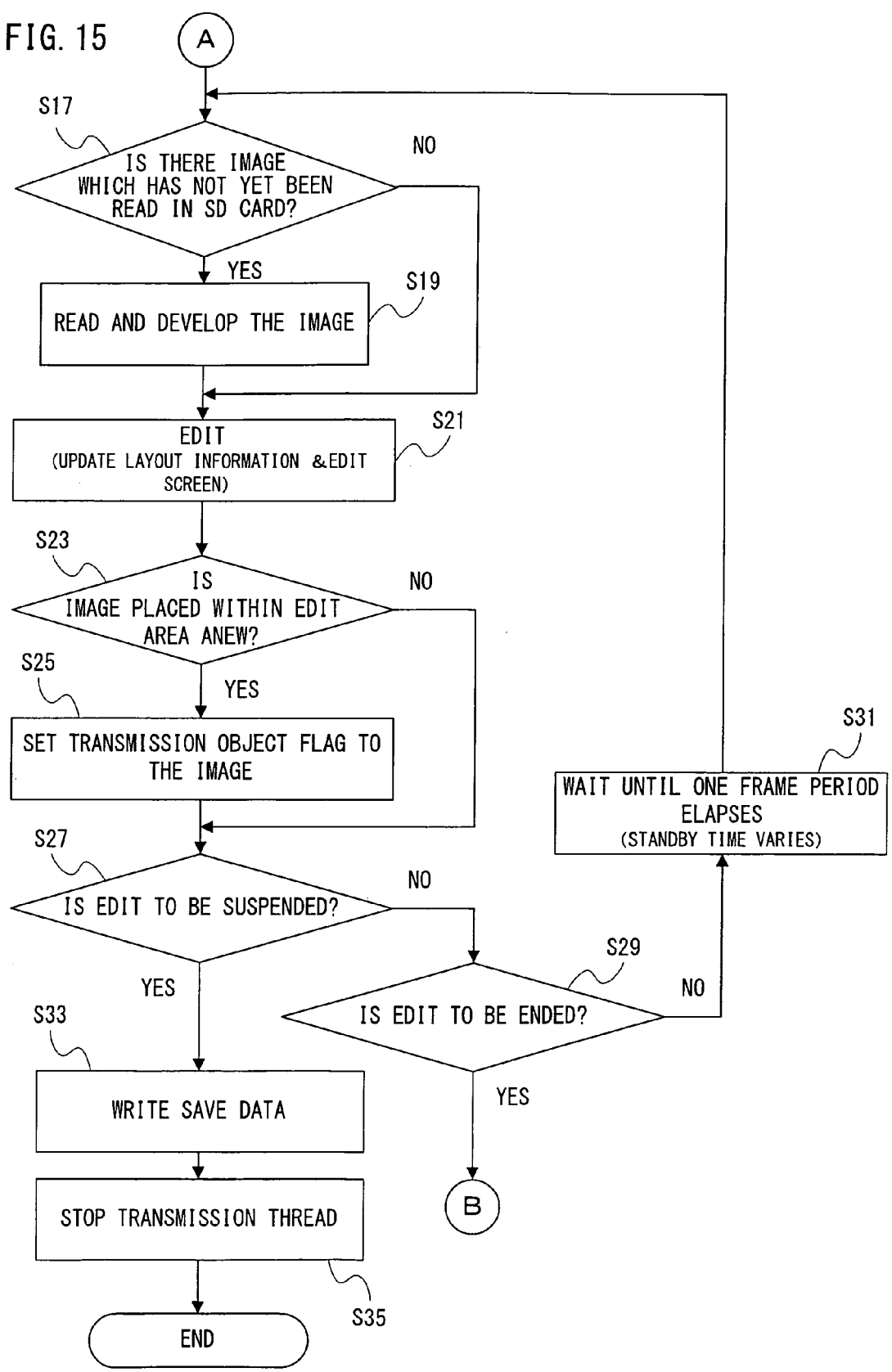
FIG. 15 is a flowchart showing another part of the operation of the CPU on the client side.
Figure 16:
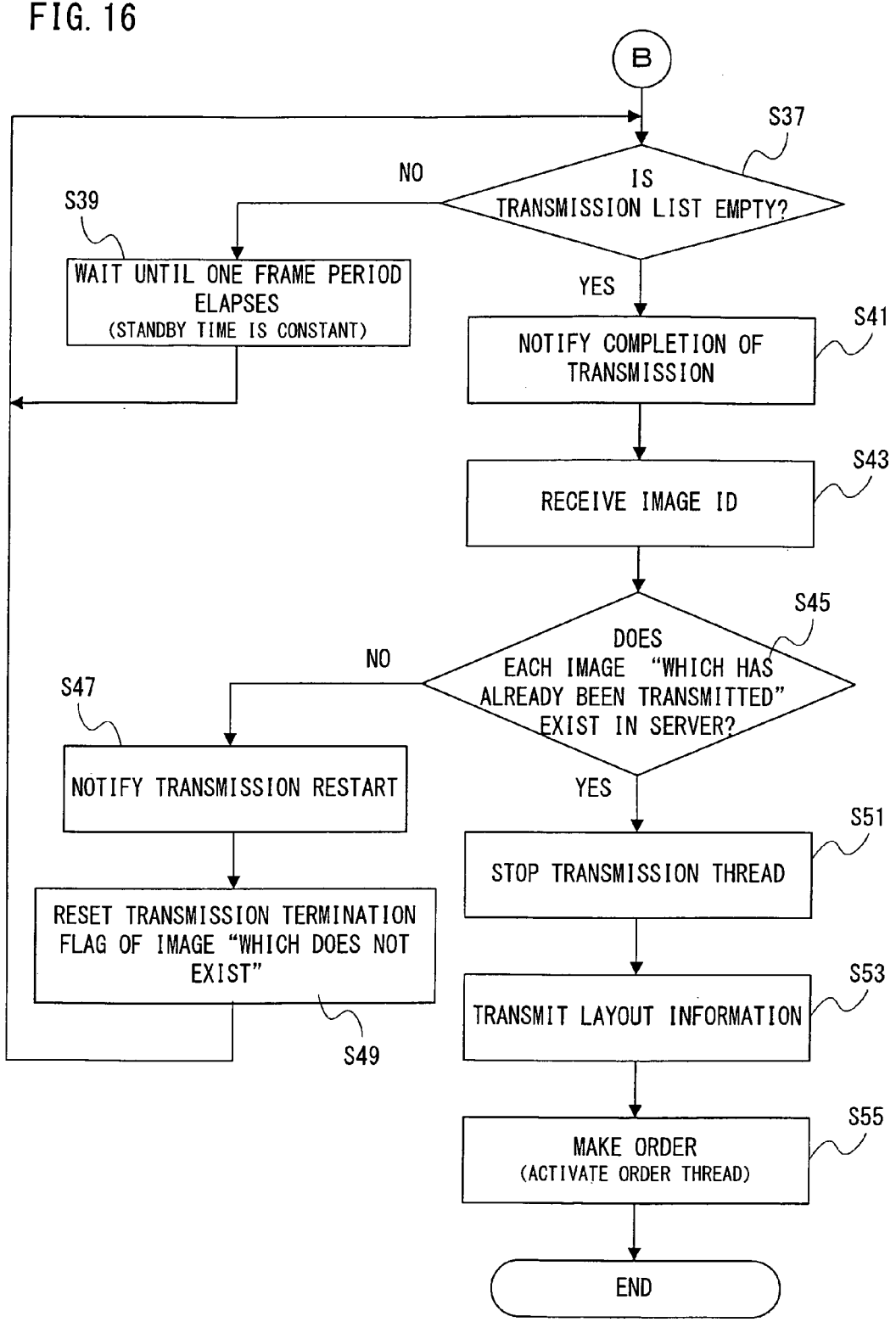
FIG. 16 is flowchart showing a still another part of the operation of the CPU on the client side.
Figure 17:
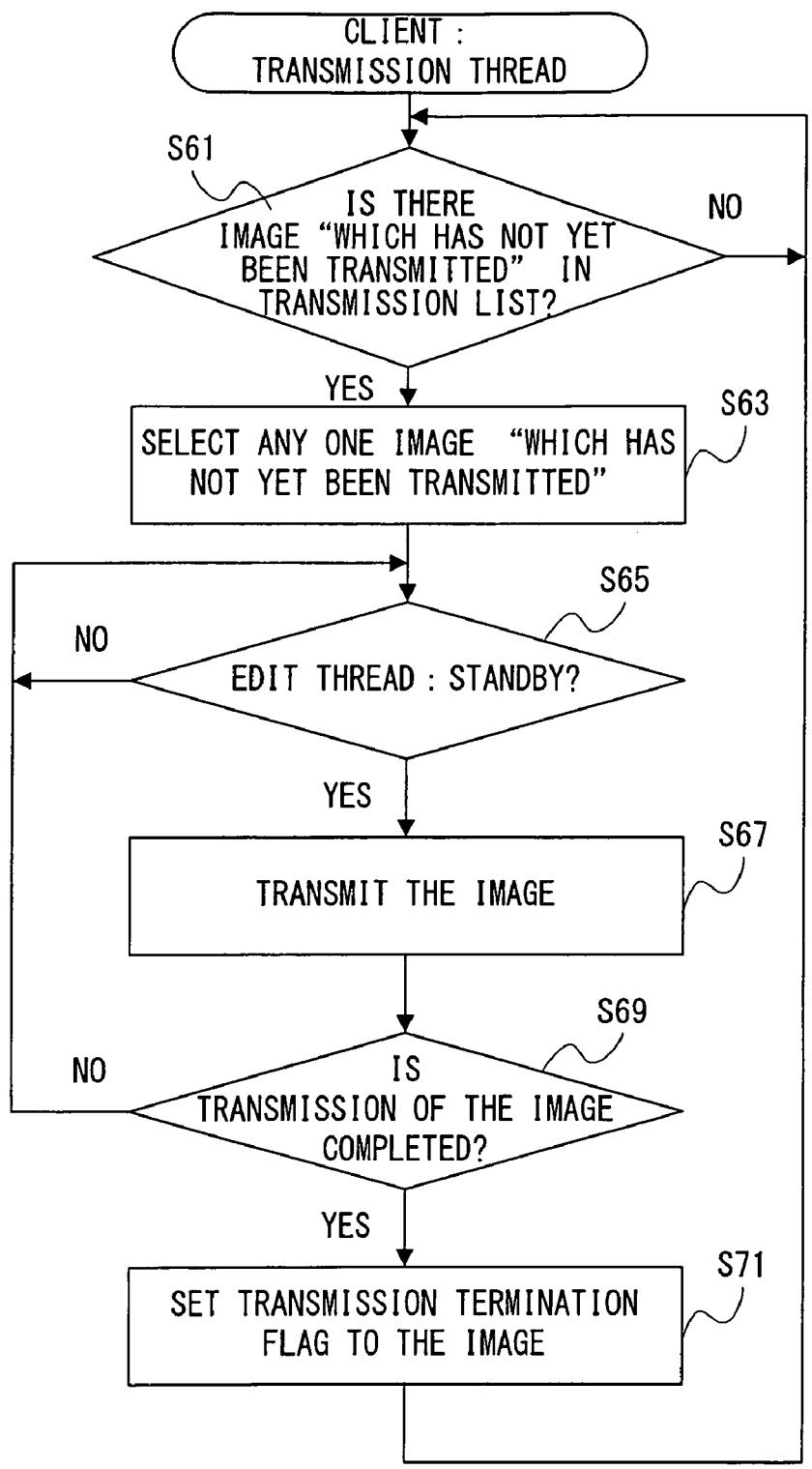
FIG. 17 is a flowchart showing a further part of the operation of the CPU on the client side.
Figure 18:
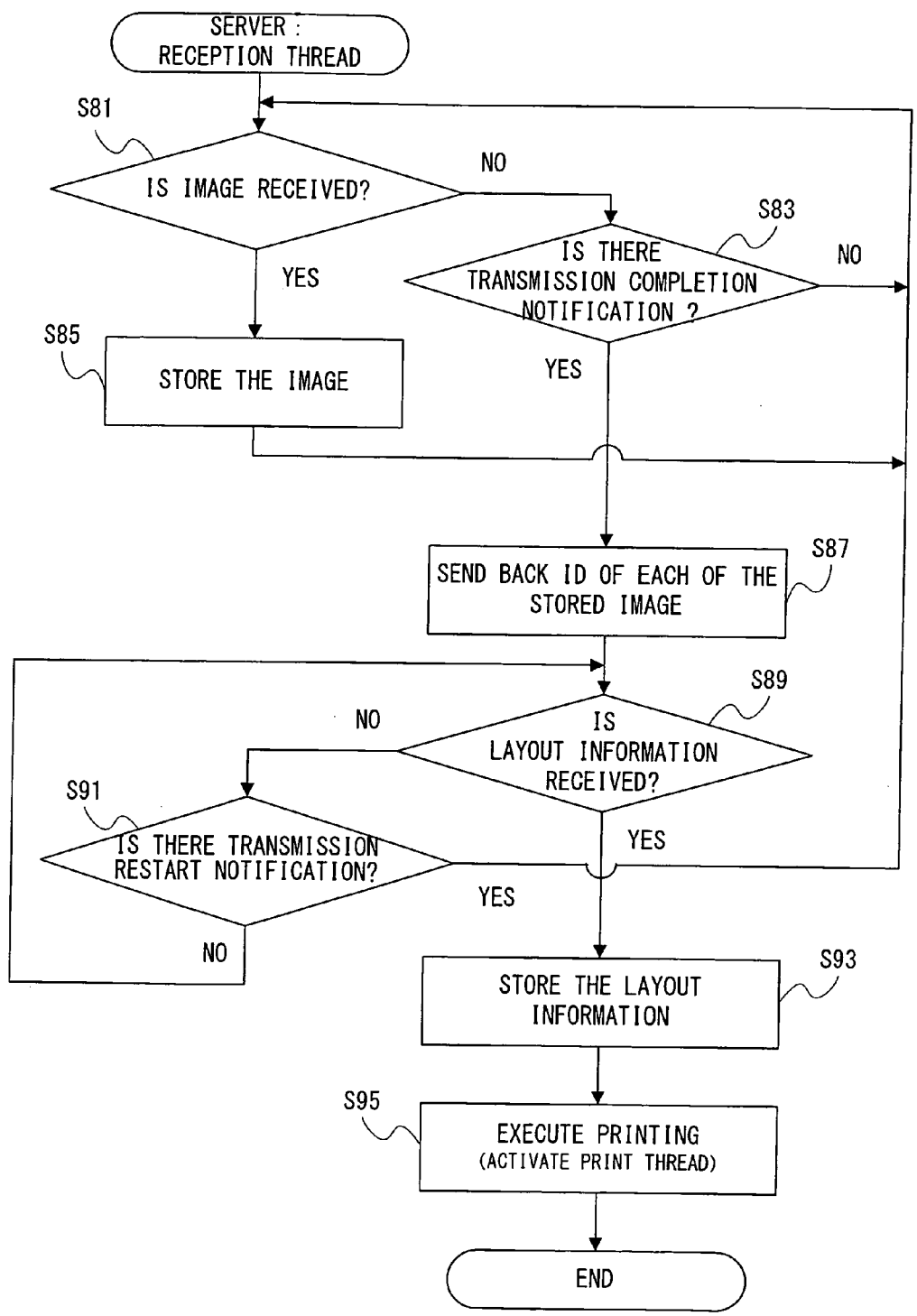
FIG. 18 is a flowchart showing a part of an operation of a CPU on the server side.

The execution of editing and image transmitting in parallel with each other as a feature of the print processing of this embodiment is realized by execution of an edit thread shown in FIG. 14-FIG. 16 and a transmission thread shown in FIG. 17 in parallel by the CPU 40 on the client side on assumption that a reception thread shown in FIG. 18 is executed on the sever side.

Here, the flowcharts shown in FIG. 14-FIG. 17 are for expressing in detail the processing between the "commercial material explaining screen" and the "order screen" out of the processing on the client side shown in FIG. 9, and corresponds to a part of the aforementioned main program. Furthermore, the flowchart shown in FIG. 18 is for expressing in detail the processing of "reception of an image and layout information" out of the processing on the server side shown in FIG. 9. In what follows, an SD card is used as a memory card 38, and this is referred as "SD card 38".

On the client side, that is, in the game system 10, an OK operation is performed in a state that the commercial material explaining screen is displayed to thereby activate the edit thread shown in FIG. 14-FIG. 16. Referring to FIG. 14, the CPU 40 determines whether or not edit processing is executed from "the continuation" in a first step S1. If there is save data in the save data area 148 (see FIG. 10) of the internal memory 42e, "YES" is determined in the step S1, and the process shifts to a step S3.

In the step S3, the CPU 40 reads file information from the SD card 38. Then, it is determined whether or not the SD card 38 is identical with that created at the previous time, that is, at the time when the save data is created in a step S5. The determination is performed by checking the file information read from the SD card 38 with the file information included in the save data. If "YES" in the step S5, the process proceeds to a step S15 through steps S7 and S9. On the other hand, if "NO" is determined in the step S1 or S5, the process proceeds to the step S15 through steps S11 and S13.

In the step S7, the CPU 40 updates the transmission list and the layout information with the save data. That is, in the internal memory 42e shown in FIG. 10, the transmission list and the layout information included in the save data stored in the save data area 148 are respectively transferred to the transmission list area 144 and the layout information area 146. In the step S9, the CPU 40 restores and displays the previous edit display (see FIG. 13) on the monitor 28 on the basis of the updated layout information. On the other hand, in the step S11, the CPU 40 clears the transmission list and the layout information. That is, each of the transmission list and the layout information respectively stored in the transmission list area 144 and the layout information area 146 is initialized. In the step S13, the CPU 40 displays the edit screen in an initialized manner on the basis of the cleared layout information on the monitor 28.

In the step S15, the CPU 40 activates the transmission thread (see FIG. 17). After the activation, the process shifts to a step S17. Although the detail is described later, the transmission thread thus activated in the step S15 through the edit thread is ended through the same edit thread in a step S35 or S51. During this period, the transmission thread is executed in parallel with the edit thread, namely, with the use of a standby time of the edit thread.

With reference to FIG. 15, in the step S17, the CPU 40 determines whether or not there is an image which has not yet been read in the SD card 38. If "NO" in the step S17, the process proceeds to a step S21 while if "YES" in the step S17, the process proceeds to the step S21 through a step S19. In the step S19, the CPU 40 reads the image which has not been read yet into the image area 142 of the internal memory 42e, and develops the image stored in the image area 142 in the editing work area 150.

In the step S21, edit processing is executed in response to an editing operation with the controller 14. In response to the result of the edit processing being received, the layout information of the layout information area 146 is updated, and the edit screen of the monitor 28 is also updated. In a succeeding step S23, it is determined whether or not any one of the images within the selection area E1 is moved into the edit area E2 (that is, selected as an object to be edited) on the edit screen as shown in FIG. 13. If "NO" in the step S23, the process proceeds to a step S27 while if "YES" in the step S23, the process proceeds to the step S27 through a step S25.

In the step S25, the CPU 40 sets the transmission object flag to the image selected as an object to be edited. More specifically, in the transmission list shown in FIG. 12, the transmission flag assigned to the relevant image ID is updated from "0" to "1". In the step S27, the CPU 40 determines whether or not the edit thread is suspended. If "NO" here, the process shifts to a step S29. In the step S29, it is further determined whether or not the edit thread it to be ended, and if "NO" also here, a standby condition is held until one frame period elapses in a step S31. After the standby processing, the process returns to the step S17.

A loop among steps S17 to S31 is executed at every frame cycle. Then, the image reading and developing processing in the step S19 is executed only during a period when there is an image which has not yet been read, and the edit processing in the step S21 is changed in load depending on the frequency and the kind of the editing operation, so that the standby time in the step S31 is also varied.

When a suspending operation with the controller 14 is performed, or when a communication condition of the network 124 is changed to make it difficult to transmit an image, or the like, "YES" is determined in the step S27, and the process is ended through steps S33 and S35. That is, the CPU 40 performs writing of the save data in the step S33, the transmission thread is stopped in the step S35, and then, the edit thread is ended.

When an end operation is performed with the controller 14, or when a state that an editing operation is not performed continues for a predetermined time or longer, "YES" is determined in the step S29, and the process shifts to a step S37.

Referring to FIG. 16, in the step S37, the CPU 40 determines whether or not the transmission list is empty. More specifically, if an image to which the transmission termination flag is not set is included in the images to which the transmission object flag is set in the transmission list (see FIG. 12) stored in the transmission list area 144, it is determined that the transmission list has not yet been empty ("NO"), and if the transmission termination flag is set to each of the images to which the transmission object flag is set, it is determined that the transmission list has already been empty ("YES").

If "NO" in the step S37, the CPU 40 waits until one frame period elapses in a step S39. Then, the process returns to the step S37. That is, the loop between the steps S37 and S39 is also executed at every frame cycle similar to the aforementioned loop in the steps S17 to S31, but the standby time in the step S39 is constant.

If "YES" in the step S37, the CPU 40 notifies the server side of the completion of the transmission in a step S41, and receives a response of the image ID from the server side in a step S43. In a step S45, it is determined whether or not each image "which has already been transmitted" exists on the server side on the basis of the image ID thus received from the server side and the transmission list (see FIG. 12) stored in the internal memory 42e.

More specifically, in the transmission list, if each of the image ID to which the transmission termination flag is set coincides with any one of the image ID from the server side, it is determined that each image "which has already been transmitted" exists on the server side ("YES") while if there is even one image ID which does not coincide with the image ID from the server side out of the image IDs to which the transmission termination flag is set, it is determined that at least one out of the images which "has already been transmitted" does not exist on the server side ("NO").

If "NO" in the step S45, the process returns to the step S37 through steps S47 and S49. That is, the CPU 40 notifies the server side of restarting the transmission in the step S47, and resets an image which does not exist on the server side out of the images which "has already been transmitted", that is, the transmission termination flag of the image "which does not exist" in the steps S49. Then, the process returns to the loop among the steps S37 and S39 to wait until the transmission list is empty again by the transmission thread.

On the other hand, if "YES" in the step S45, the process is ended through the processing in steps S51-S55. That is, the CPU 40 stops the transmission thread in the step S51, and transmits the layout information stored in the layout information area 146 of the internal memory 42e to the server side in the step S53. Then, in the step S55, the order thread not shown is activated, and then, the edit thread is ended.

Furthermore, the above-described confirmation as to whether or not the transmission has been terminated through reception of the image ID from the server may be executed when an edit is performed from the continuation by reading the save data. That is, an image ID of the image which has already been transmitted in the save data is inquired to the server. If all the image IDs are sent back from the server, an edit may be performed from the continuation, and if some image IDs do not exist, the processing from the continuation may not be performed. This makes it possible to perform a confirmation when an image is deleted from the server after a lapse of a long time from the suspension, and so on, and to surely make an order.

Referring to FIG. 17, when the transmission thread is activated, the CPU 40 determines whether or not there is an image "which has not been transmitted" in the transmission list in a step S61. More specifically, in the transmission list (see FIG. 12), if there is even one image ID to which the transmission termination flag is not set out of the image IDs to which the transmission object flag is set, it is determined that there is an image which "has not yet been transmitted" ("YES") while if the transmission termination flag is set to each of the image IDs to which the transmission object flag is set, it is determined that there is no image which "has not yet been transmitted" ("NO").

If the determination result in the step S61 is "NO", the CPU 40 waits until the determination result shifts to "YES". If the determination result in the step S61 is "YES", the process enters a loop among steps S65-S69 through a step S63. That is, the CPU 40 selects any one image "which has not yet been transmitted" in the step S63, and it is determined whether or not the edit thread (FIG. 14—see FIG. 16) is placed in the standby condition in the step S65. If the determination result in the step S65 is "NO", the CPU 40 waits until the determination result shifts to "YES". If the determination result in the step S65 is "YES", the process proceeds to the step S67. In the step S67, the CPU 40 executes transmission processing targeted at the image selected in the step S63. In the next step S69, the CPU 40 determines whether or not the transmission of the image is completed, and if "NO" here, the process returns to the step S65.

If "YES" in the step S69, the process goes out of the loop to proceed to a step S71. In the step S71, the CPU 40 sets the transmission termination flag to the image. Then, the process returns to the step S61.

Thus, if there is an image which "has not yet been transmitted" on the client side, the image is transmitted to the server side by the transmission thread by utilizing the standby time of the edit thread. Accordingly, without disturbing periodicity of the edit processing, moreover, without loss of comfortability of the editing operation, it is possible to execute the image transmitting processing in the background.

On the other hand, on the server side, that is, in the print server 122, in response to the transmission thread being activated on the client side, a reception thread is activated shown in FIG. 18. With reference to FIG. 18, in the reception thread, the process first enters a loop between steps S81 and S83. That is, it is determined whether or not the image from the client side (see step S67) is received in the step S81, and if "NO" here, the presence or absence of the transmission completion notification (see step S41) is further determined in the step S83. If "NO" here, the process returns to the step S81.

If "YES" in the step S81, the process returns to the step S81 through a step S85. In the step S85, the image is stored in the server side. If "YES" in the step S83, the process proceeds to a step S87. In the step S87, an ID of each stored image is sent back to the client side.

After sending back the ID, the process enters a loop between steps S89 and S91. That is, it is determined whether or not the layout information (see step S53) from the client side is received in the step S89, and if "NO" here, it is further determined the presence or absence of the transmission restart notification (see step S47) in the step S91. If "NO" here, the process returns to the step S89.

If "YES" in the step S89, the process is ended through steps S93 and S95. In the step S93, the layout information is stored on the server side. In the step S95, the print thread not shown is activated to thereby print the image on the basis of the layout information.

If "YES" in the step S91, the process enters the loop between the steps S81 and S83 in order to receive an image "which does not exist" (see step S49).

Additionally, in a case that a plurality of clients exist, the reception thread similar to FIG. 18 is activated for each client, and the plurality of reception threads are executed in parallel with each other.

As understood from the above description, in this embodiment, the client side, that is, the CPU 40 of the game system 10 performs an edit on at least one image on the basis of an instruction by the user with the controller 14 (S21), transmits the image data of the image from the wireless communication module 50 to the network 124 during execution of the editing (S61-S71), and further transmits the layout information indicating the layout of the image after the edit (S53). Thus, during execution of the edit, the transmission of the image data proceeds, so that it is possible to cut the standby time until the transmission is completed.

Furthermore, in the above description, the game system 10 is explained, but the invention can be applied to an image transmitting apparatus which transmits image data and the layout of the image on the basis of the editing of the image by the user. However, in place of the layout, or in addition thereto, order information (print size, the number of copies, destination to be distributed, for example) on the basis of an operation by the user may be transmitted. Furthermore, the transmission destination of the image data, etc. may not necessarily be on a network, and may be a stand-alone printer having server function. In other words, the invention can be applied to an image transmitting apparatus which transmits image data corresponding to a desired image and control information based on a user's operation in order to execute print processing on the basis of the image data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image transmitting apparatus to transmit image data and a layout of an image to a network on the basis of an edit of the image by a user, comprising:
    an editing unit for performing an edit of at least one image on the basis of an instruction by the user;
    an image data transmitting unit for transmitting image data of the image as an object to be edited during execution of the edit; and
    a layout information transmitting unit for transmitting layout information indicating a layout of the image after completion of said edit.

2. The image transmitting apparatus according to claim 1, further comprising:
    an image data storing unit for storing image data; and
    a selecting unit for causing a user to select an image as said object to be edited, wherein
    said image data transmitting unit transmits image data of the image selected by said selecting unit out of the image data stored in said image data storing unit.

3. The image transmitting apparatus according to claim 2, further comprising:
    a transmission list storing unit for storing a list of images to be transmitted with respect to the image data stored in said image data storing unit; and
    a transmission image adding unit for adding, every time that an image is selected by said selecting unit, the selected image to said list, wherein
    said image data transmitting unit transmits the image data of the images included in said list during execution of said edit.

4. The image transmitting apparatus according to claim 1, wherein
    said layout information transmitting unit transmits said layout information after completion of said edit, and after completion of transmitting said image data.

5. The image transmitting apparatus according to claim 3, further comprising:
    a suspended information storing unit for storing a layout which is being edited and the list of the image to be transmitted with respect to the image data stored in said image data storing unit in a case that said edit is suspended; and
    an edit restarting unit for restarting said edit on the basis of the layout stored in said suspended information storing unit, wherein
    said image data transmitting unit transmits the image data which has not yet been transmitted out of the image to be transmitted on the basis of the list stored in said suspended information storing unit after restarting said edit.

6. The image transmitting apparatus according to claim 2, further comprising
    an interface displaying unit for displaying on a display an edit area to allow the user to perform an edit and a selection area where images are arranged so as to be selectable as the object to be edited, wherein
    said selecting unit makes a selection by causing the user to arrange an image within said selection area to said edit area.

7. The image transmitting apparatus according to claim 6, wherein
    said layout information includes at least identification information for identifying image data, a position of an image and a size of an image, and
    said editing unit performs an edit of the layout by causing the user to arrange the image within said edit area.

8. The image transmitting apparatus according to claim 5, wherein
    said suspended information storing unit further stores identification information for identifying the images stored in said image data storing unit at a time of suspending the edit, further comprising
    a determining unit for, by comparing the identification information of the image stored in said image data storing unit and the identification information stored in said suspended information storing unit at a time of restarting the edit, determining at a time of restarting the edit whether or not the image data stored in said image data storing unit is identical with the image at a time of suspending the edit, wherein
    said image data transmitting unit transmits the image data which has not yet been transmitted out of the images to be transmitted on the basis of the list stored in said suspended information storing unit after restarting the edit in a case that said determining unit determines that the image data is identical with the image data at a time of suspending the edit.

9. The image transmitting apparatus according to claim 3, wherein
    said list registers identification information for identifying each image,
    said image data transmitting unit transmits identification information of said image attached to the image data of each image,
    said network has a server for receiving the image data from said image data transmitting unit and returning the identification information in addition to said image data, further comprising
    a determining unit for determining whether or not said server receives each image by checking the identification information returned from said server with the identification information registered in said list, wherein
    said image data transmitting unit resends the image about which said determining unit determines that said server does not receive.

10. A non-transitory recording medium recording an image transmitting program, said image transmitting program causes a computer of an image transmitting apparatus for transmitting to a network image data and a layout of the image on the basis of the edit of the image by the user to execute:
   performing an edit of at least one image on the basis of an instruction by the user;
   transmitting image data of the image as an object to be edited during execution of the edit; and
   transmitting layout information indicating a layout of the image after completion of said edit.

11. The non-transitory recording medium recording an image transmitting program according to claim 10, wherein
   said image transmitting program further causes said computer to execute:
   storing image data in an image data storage unit; and
   causing a user to select an image as said object to be edited, wherein
   image data of the selected image out of the image data stored in said image data storing unit is transmitted.

12. The non-transitory recording medium recording an image transmitting program according to claim 11, wherein
   said image transmitting program further causes said computer to execute:
   storing a list of the image as the object to be edited;
   adding, every time that an image is selected, the selected image to said list; and
   transmitting the image data of the images included in said list during execution of said edit.

13. The non-transitory recording medium recording an image transmitting program according to claim 10, wherein
   said layout information is transmitted after completion of said edit, and after completion of transmitting said image data.

14. The non-transitory recording medium recording an image transmitting program according to claim 12, wherein
   said image transmitting program causes said computer to further execute:
   storing a layout which is being edited and the list of said images to be transmitted in a case that said edit is suspended;
   restarting said edit on the basis of the stored layout information; and
   transmitting the image data which has not yet been transmitted out of the image to be transmitted.

15. The non-transitory recording medium recording an image transmitting program according to claim 11, wherein
   said image transmitting program causes said computer to further execute:
   displaying on a display an edit area to allow the user to perform an edit and a selection area where images are arranged so as to be selectable as the object to be edited, wherein
   a selection is made by causing the user to arrange the image within said selection area into said edit area.

16. The non-transitory recording medium recording an image transmitting program according to claim 15, wherein
   said layout information includes at least identification information for identifying image data, a position of an image and a size of an image, and
   an edit of the layout is performed by causing the user to arrange the image within said edit area.

17. The non-transitory recording medium recording an image transmitting program according to claim 14, wherein
   identification information is stored for identifying the images stored in said image data storing unit,
   said image transmitting program causes said computer to further execute determining, by comparing the identification information of the image stored in said image data storing unit and the stored identification information at a time of restarting the edit, whether or not the image data stored in said image data storing unit is identical with the image at a time of suspending the edit, wherein
   the image data which has not yet been transmitted out of the images to be transmitted is transmitted after restarting the edit in a case that the image data is identical with the image data at a time of suspending the edit.

18. The non-transitory recording medium recording an image transmitting program according to claim 12, wherein
   said list registers identification information for identifying each image,
   identification information of said image is transmitted in addition to the image data of each image,
   said network has a server for receiving the transmitted image data and returning the identification information attached to said image data, and
   said image transmitting program causes said computer to further execute determining whether or not said server receives each image by checking the identification information returned from said server with the identification information registered in said list, wherein
   the image that said server does not receive is resent.

19. An image transmitting method of an image transmitting apparatus to transmit image data and a layout of an image to a network on the basis of an edit of the image by a user, comprising:
   performing an edit of at least one image on the basis of an instruction by the user;
   transmitting image data of the image as an object to be edited during execution of the edit; and
   transmitting layout information indicating a layout of the image after completion of said edit.

20. An image transmitting apparatus for transmitting image data corresponding to a desired image and control information according to an operation by a user to execute print processing based on the image data, comprising:
   a first updating unit for repetitively executing update processing to update said control information in response to an updating operation;
   a first transmitting unit for executing transmission processing to transmit said image data in parallel with the update processing by said first updating unit; and
   a second transmitting unit for executing transmission processing of said control information after end of executing the update processing by said first updating unit.

21. The image transmitting apparatus according to claim 20, wherein
   said first transmitting unit starts the transmission processing in response to a specifying operation for specifying at least a part of said desired image.

22. The image transmitting apparatus according to claim 20, further comprising:
   a second updating unit for updating a list on which identifiers of the images which has not been transmitted yet out of said desired images are registered in correspondence with progress of the transmission processing by said first transmitting unit; and
   a saving unit for saving said control information and said list in response to a suspend operation, wherein
   said first updating unit and said first transmitting unit restart the update processing and the transmission processing, respectively after updating said control information and said list with the control information and the list saved by said saving unit in response to the restart operation.

* * * * *